(12) United States Patent
Park et al.

(10) Patent No.: US 12,737,010 B2
(45) Date of Patent: Sep. 15, 2026

(54) DISPLAY DEVICE AND METHOD FOR MANUFACTURING THE DISPLAY DEVICE

(71) Applicant: SAMSUNG DISPLAY CO., LTD., Yongin-si (KR)

(72) Inventors: Min Hee Park, Yongin-si (KR); Moon Kon Kim, Yongin-si (KR); Hee Chang Kim, Yongin-si (KR); Ki Yol Nam, Yongin-si (KR); Kyung Hoon Chae, Yongin-si (KR); Ha Young Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 92 days.

(21) Appl. No.: 18/648,756

(22) Filed: Apr. 29, 2024

(65) Prior Publication Data

US 2025/0117046 A1 Apr. 10, 2025

(30) Foreign Application Priority Data

Oct. 5, 2023 (KR) ........................ 10-2023-0132764

(51) Int. Cl.
*G06F 1/16* (2006.01)

(52) U.S. Cl.
CPC ............ *G06F 1/1656* (2013.01); *G06F 1/163* (2013.01); *G06F 1/1652* (2013.01)

(58) Field of Classification Search
CPC ...... G06F 1/1656; G06F 1/163; G06F 1/1652; G06F 1/1637; H10K 59/87; H10K 71/00; H10K 77/111
See application file for complete search history.

(56) References Cited

U.S. PATENT DOCUMENTS

| | | | | |
|---|---|---|---|---|
| 8,792,252 B2 * | 7/2014 | Hwang | .................. | G02B 30/25 349/59 |
| 10,374,194 B2 * | 8/2019 | Son | ...................... | H10K 77/111 |
| 11,468,832 B2 * | 10/2022 | Zhu | ...................... | H10D 86/411 |
| 11,798,928 B2 * | 10/2023 | Shin | ..................... | H10K 50/844 |
| 11,800,649 B2 * | 10/2023 | Burke | ................... | G06F 1/1656 |
| 12,232,350 B2 * | 2/2025 | Choi | ..................... | G06F 1/1681 |
| 12,342,517 B2 * | 6/2025 | Qian | ................... | H04M 1/0266 |
| 12,353,241 B1 * | 7/2025 | Kakuda | ................... | G06F 1/181 |
| 2015/0282304 A1 | 10/2015 | Ely et al. | | |
| 2020/0196496 A1 * | 6/2020 | Shin | .......................... | G06F 1/16 |
| 2021/0167328 A1 * | 6/2021 | Kim | ....................... | H05K 3/361 |
| 2021/0168929 A1 * | 6/2021 | Wang | ..................... | H05K 1/028 |

(Continued)

FOREIGN PATENT DOCUMENTS

| | | |
|---|---|---|
| CN | 110556407 A | 12/2019 |
| KR | 10-2024-0065614 A | 5/2024 |
| KR | 10-2024-0108888 A | 7/2024 |

*Primary Examiner* — Rockshana D Chowdhury
(74) *Attorney, Agent, or Firm* — F. CHAU & ASSOCIATES, LLC

(57) ABSTRACT

A display device including, a display module, the display module including, a display panel, a cover spacer disposed under the display module, and a step compensation portion disposed on the display panel and the cover spacer, and an outer structure surrounding the display module, wherein an edge portion of the display panel protrudes beyond an edge portion of the cover spacer, a recessed portion is disposed at the edge portion of the cover spacer and under the display panel, and the step compensation portion overlaps the recessed portion.

20 Claims, 25 Drawing Sheets

(56) References Cited

U.S. PATENT DOCUMENTS

| | | | | |
|---|---|---|---|---|
| 2021/0405688 | A1* | 12/2021 | Barrett | G09F 9/301 |
| 2022/0209180 | A1* | 6/2022 | Song | B32B 7/12 |
| 2022/0225523 | A1* | 7/2022 | Nguyen | H10K 77/111 |
| 2022/0270522 | A1* | 8/2022 | Afsar | G09F 9/33 |
| 2024/0152184 | A1* | 5/2024 | Chae | G02B 27/026 |
| 2024/0224725 | A1* | 7/2024 | Hwang | H10K 59/873 |
| 2025/0117046 | A1* | 4/2025 | Park | G06F 1/1652 |

* cited by examiner

DR3

10 : DM, CPS
DM : 100, 200, 300, 400, 500
100 : 101, 102

10 : DM, DIC, PCB
MLD : 1000, 2000, 3000
2000 : 2100, 2200, 2300, 2410, 2510
3000 : 3100, 3200, 3300, 3400, 3500, 3610, 3620

10 : DM, DIC, PCB
MLD : 1000, 2000, 3000
2000 : 2100, 2200, 2300, 2410, 2510
3000 : 3100, 3200, 3300, 3400, 3500, 3610, 3620

10 : DM, DIC, PCB
MLD : 1000, 2000, 3000
2000 : 2100, 2200, 2300, 2410, 2510
3000 : 3100, 3200, 3300, 3400, 3500, 3610, 3620
CHD2 : CHD2_1, CHD2_2

DISPLAY DEVICE AND METHOD FOR MANUFACTURING THE DISPLAY DEVICE

CROSS-REFERENCE TO RELATED APPLICATION

This application claims priority under 35 U.S.C. 119 from Korean Patent Application No. 10-2023-0132764, filed on Oct. 5, 2023, in the Korean Intellectual Property Office, the disclosure of which is herein incorporated by reference in its entirety.

BACKGROUND

1. Technical Field

The present disclosure relates to a display device and a method for manufacturing the display device.

2. Discussion of Related Art

With the advance of information-oriented society, increasing demands are being placed on display devices in connection with the manner in which images may be displayed. The display device may be a flat panel display device such as a liquid crystal display, a field emission display or a light emitting display. A light emitting display device may include an organic light emitting display device including an organic light emitting diode element as a light emitting element or a light emitting diode display device including an inorganic light emitting diode element such as a light emitting diode (LED) as a light emitting element.

In addition, the display device may be a flexible display device in which edge portions of display device may be bent to have a predetermined curvature. In connection with the development of flexible display devices, research on cover windows including curved surfaces has been proposed.

Meanwhile, as the cost and the level of difficulty of a display device manufacturing process increases with the development of the technology, a process of modularizing components of the display device and assembling them individually has been proposed.

SUMMARY

Aspects of the present disclosure provide a display device in which a dead space between a display driving module and a middle frame may be reduced or eliminated, and a method for manufacturing the display device.

Aspects of the present disclosure also provide a display device in which a paste for forming an outer structure is inhibited or prevented from permeating into a display driving module and a method for manufacturing the display device.

Aspects of the present disclosure also provide a display device in which a paste for forming a step compensation portion effectively permeates into a recessed portion and a method of manufacturing the display device.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a display device includes, a display module, the display module including, a display panel, a cover spacer disposed under the display panel, and a step compensation portion disposed on the display panel and the cover spacer, and an outer structure surrounding the display module, wherein an edge portion of the display panel protrudes beyond an edge portion of the cover spacer, a recessed portion is disposed at the edge portion of the cover spacer and under the display panel, and the step compensation portion overlaps the recessed portion.

In an embodiment, the step compensation portion may be disposed at an inner side of the outer structure.

In an embodiment, the step compensation portion may be spaced apart from the outer structure.

In an embodiment, the display device may include a cover window, wherein the display panel may include a first portion disposed on the cover window, and a second portion disposed on the first portion and including the edge portion of the display panel, and the step compensation portion overlaps the edge portion of the second portion.

In an embodiment, the step compensation portion may filled in the recessed portion.

In an embodiment, the step compensation portion may be in contact with at least one of a bottom surface, a side surface, or a top surface of a first end portion of the display panel disposed at the edge portion of the display panel.

In an embodiment, the step compensation portion may be in contact with a side surface of an edge portion of the cover spacer defining an end of the recessed portion.

In an embodiment, the display panel may include a through hole penetrating entirely through the display panel an exposing at least a portion of the recessed portion.

In an embodiment, the through hole may be disposed at the edge portion of the display panel and may have a combed shape or a saw-toothed shape.

In an embodiment, the through hole may be spaced apart from the edge portion of the display device and may be disposed at a first end portion of the display panel.

In an embodiment, the first end portion of the display device may have a ladder shape.

In an embodiment, the through hole may include a plurality of holes spaced apart from each other and disposed adjacent to the edge portion of the display panel.

In an embodiment, the through hole may include a single hole extending adjacent to the edge portion of the display panel.

According to an aspect of the present disclosure, a display device includes, a display panel including a main region, a bending area disposed on a side of the main region and bent to a bottom side of the main region, and a sub-region disposed on a side of the bending area and at the bottom side of the main region, and including a first portion disposed in the main region and a second portion disposed in the sub-region, a cover spacer disposed between the first portion and the second portion, a step compensation portion disposed on the display panel, and an outer structure disposed to surround the display panel, the cover spacer, and the step compensation portion, wherein an edge portion of the second portion protrudes beyond an edge portion of the cover spacer, a recessed portion is disposed between the first portion and the edge portion of the second portion, and the step compensation portion overlaps the recessed portion.

In an embodiment, the step compensation portion may be disposed in the recessed portion and below at least a portion of the first portion.

In an embodiment, the outer structure may include, an outer portion disposed at an outer side of the bending area, and an inner portion disposed at an inner side of the bending area.

In an embodiment, the display device may further include a bending protection layer disposed at an outer side of the display panel in the bending area, wherein the outer portion is in contact with the bending protection layer.

According to an aspect of the present disclosure, a method for manufacturing a display device includes a display module and a cover window disposed on the display module, the method including, forming a step compensation portion encapsulating a reverse step included in the display module, and forming an outer structure disposed to surround the display module, wherein the step compensation portion is formed by curing a first paste, the outer structure is formed by curing a second paste, and the step compensation portion is disposed to be spaced apart from the outer structure.

In an embodiment, a viscosity of the second paste may be greater than a viscosity of the first paste.

In an embodiment, the display module may include a display panel and a cover spacer disposed under the display panel and defining the reverse step, wherein forming the step compensation portion encapsulating the reverse step may include depositing the first paste on the display panel and the cover spacer formed under the display panel through a through hole formed in the display panel.

In accordance with the display device and the method for manufacturing the display device according to an embodiment of the present disclosure, it may be possible to reduce or eliminate the dead space between the display driving module and the middle frame.

In accordance with the display device and the method for manufacturing the display device according to an embodiment of the present disclosure, it may be possible to inhibit or prevent the paste for forming the outer structure from permeating into the display driving module.

In accordance with the display device and the method for manufacturing the display device according to an embodiment of the present disclosure, the paste for forming the step compensation portion may effectively permeate into the recessed portion.

However, embodiments of the present disclosure and effects thereof are not limited to those described herein and various other effects are incorporated herein.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION

Embodiments of the present disclosure will now be described more fully hereinafter with reference to the accompanying drawings. Embodiments may, however, be provided in different forms and should not be construed as limited to embodiments set forth herein. Rather, embodiments are provided so that this disclosure will be thorough and complete, and will fully convey the scope of the invention to those skilled in the art.

It will also be understood that when a layer is referred to as being "on" another layer or substrate, the layer can be directly on the other layer or substrate, or intervening layers may also be present. In contrast, when an element is referred to as being "directly on" another element, there may be no intervening elements present. The same reference numbers indicate the same components throughout the specification.

Hereinafter, embodiments of the present disclosure will be described in detail with reference to the accompanying drawings.

Figure 1:
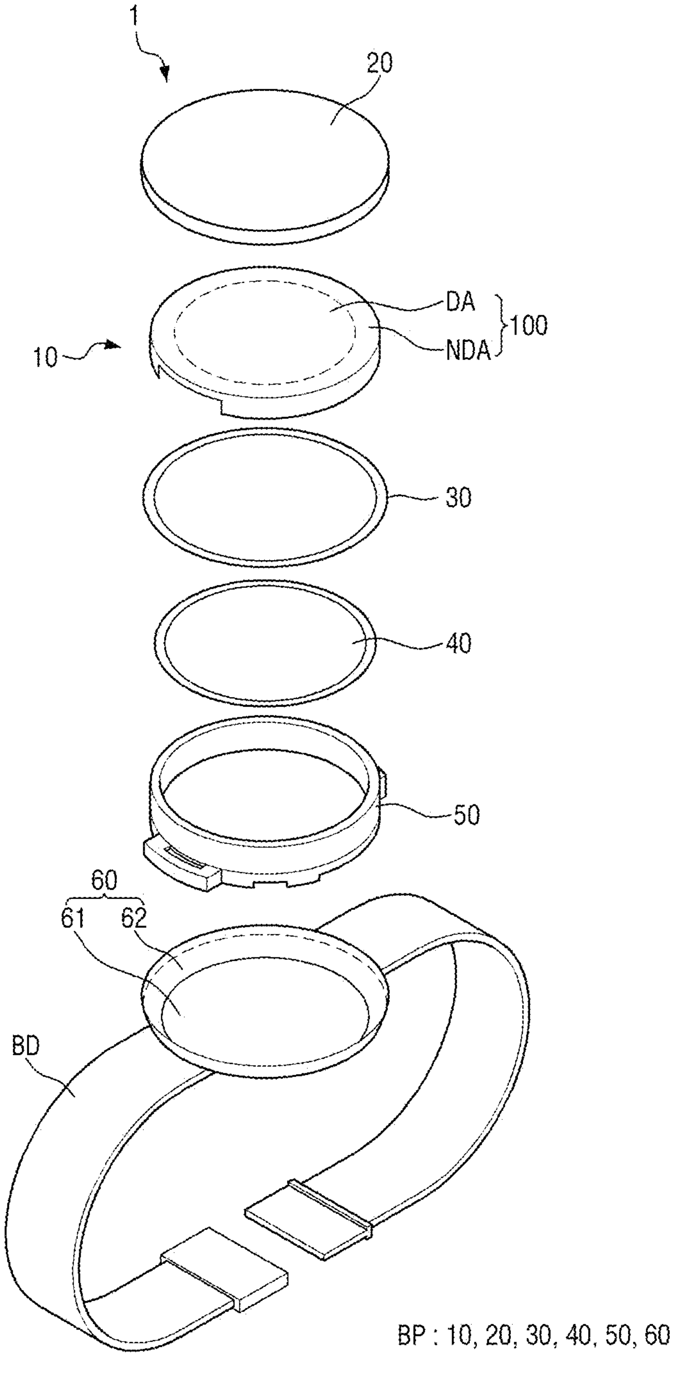
FIG. 1 is a perspective view showing a display device according to an embodiment.

FIG. 1 is a perspective view showing a display device according to an embodiment.

Referring to FIG. 1, a display device 1 according to an embodiment may include a main body unit BP and a wearable portion BD. In this specification, a case where the display device 1 is a smart watch is described as an example, but the present disclosure is not limited thereto. In another embodiment, the display device 1 may be a different display device, such as a smartphone, a television, a computer, or the like.

The main body unit BP may include a display driving module 10 where an image may be displayed, a cover window 20, an outer structure 30, a coupling member 40, a middle frame 50, and a lower cover 60. In the main body unit BP, the lower cover 60, the middle frame 50, the coupling member 40, the outer structure 30, the display driving module 10, and the cover window 20 may be sequentially arranged.

The display driving module 10 may include a display panel 100. The display panel 100 may be a display screen on which various kinds of information, contents, a user interface, or the like may be displayed as images. The display panel 100 may be an organic light emitting display panel, a liquid crystal display panel, or the like, but is not limited thereto. The display panel 100 may include a display area DA where an image may be displayed and a non-display area NDA disposed around the display area DA. As shown in FIG. 1, the planar shape of the display panel 100 may be substantially a circular shape, but is not limited thereto, and may be various shapes, for example, a polygonal shape such as a quadrilateral shape, or an elliptical shape.

The cover window 20 may be disposed on the display driving module 10. The cover window 20 may protect the display driving module 10. The cover window 20 may transmit light emitted from the display driving module 10. In some embodiments, the cover window 20 may include a light blocking portion, which may block at least a portion of the light emitted from the display driving module 10.

The cover window 20 may be made of a transparent plastic material, a glass material, or a tempered glass material. In an embodiment, the cover window 20 may be formed of sapphire glass or chemically strengthened glass, or a laminated structure thereof. In another embodiment, the cover window 20 may include a polyethyleneterephthalate (PET), polycarbonate (PC), polyethersulfone (PES), polyethylenapthanate (PEN), or polynorborneen (PNB). The cover window 20 may be made of tempered glass, which may resist scratches while having good transparency.

The cover window 20 may be disposed to overlap the display driving module 10 and cover the entire surface of the display driving module 10. The cover window 20 may have a substantially similar shape to that of the display driving module 10 in plan view. The size of the cover window 20 may be greater than that of the display driving module 10. For example, the cover window 20 may protrude beyond a periphery of the display driving module 10. The cover window 20 may have a substantially planar shape. The planar shape of the cover window 20 may be substantially the same as the planar shape of the main body unit BP. For example, the planar shape of the cover window 20 may have a substantially circular shape, but is not limited thereto and the cover window 20 may have various shapes, for example, a polygonal shape such as a quadrilateral shape, or an elliptical shape.

In some embodiments, as illustrated in the drawings, the cover window 20 may be a flat type window. For example, the cover window 20 may substantially have a flat plate shape. However, the present disclosure is not limited thereto, and in another embodiment, the cover window 20 may be a three-dimensional or dome-type three-dimensional window. In this case, the cover window 20 may include a central portion and a curved portion bent from the central portion. In addition, the cover window 20 may have an flat outer edge portion or a beveled outer edge portion.

The outer structure 30 may be disposed between the cover window 20 and the middle frame 50. The outer structure 30 may couple the display driving module 10, the cover window 20, the coupling member 40, and the middle frame 50 (see FIG. 8).

The outer structure 30 may be disposed along the edge portion of the display driving module 10. In some embodiments, the outer structure 30 may have an annular shape with a central hole in plan view. For example, the outer structure 30 may have a donut shape or a ring shape in plan view. In plan view, the shape and size of the outer structure 30 may correspond to the shape and size of the inner surface of the cover window 20. For example, when the inner surface of the cover window 20 has a circular shape in plan view, the outer structure 30 may also have a circular shape.

In some embodiments, the outer structure 30 may contain resin. For example, the outer structure 30 may be made of an optically clear resin (OCR), but is not limited thereto. The outer structure 30 may be applied in a liquid or paste state to the outer part of the display driving module 10. For example, the outer structure 30 may be formed by injecting paste into a mold included in a mold unit MLD (see FIG. 17) described herein. Thereafter, the outer structure 30 may be formed by curing using ultraviolet rays or heat. The formation process of the outer structure 30 is described herein with reference to FIG. 16 or the like.

The coupling member 40 may be disposed between the outer structure 30 and the middle frame 50. The coupling member 40 may bond the outer structure 30 and the middle frame 50 to each other. The coupling member 40 may be, for example, an adhesive tape having an adhesive material applied to sides thereof and having a waterproof or dust-proof function.

The coupling member 40 may be disposed along an inner edge portion of the middle frame 50. In some embodiments, the coupling member 40 may have an annular shape with a central hole in plan view. For example, the coupling member 40 may have a donut shape or a ring shape in plan view. In plan view, the shape and size of the coupling member 40 may correspond to the shape and size of the middle frame 50. For example, in plan view, when the middle frame 50 has a circular shape, the coupling member 40 may also have a circular shape.

The middle frame 50 may be disposed between the cover window 20 and the lower cover 60. The middle frame 50 may be an intermediate coupling member for coupling the cover window 20 and the lower cover 60. For example, the middle frame 50 may include a bracket.

The lower cover 60 may be disposed at a lower (e.g., a lowest) part of the main body unit BP. The lower cover 60 may be disposed under the middle frame 50. The lower cover 60 may be a housing coupled to the middle frame 50.

In some embodiments, the lower cover 60 may include a central cover portion 61 and a peripheral portion 62.

The central cover portion 61 may be located at the center of the lower cover 60, and may be substantially flat. The central cover portion 61 may be an area corresponding to the cover window 20.

The peripheral portion 62 may be disposed around the central cover portion 61. The peripheral portion 62 may be disposed to surround the central cover portion 61. The peripheral portion 62 may be a portion that is bent from the central cover portion 61. In some embodiments, a part of the peripheral portion 62 may include a curved surface having a predetermined curvature, and another part of the peripheral portion 62 may be flat. A degree (or angle) at which the peripheral portion 62 is bent from the central cover portion 61 may be an obtuse angle, but is not limited thereto and may be a right angle or an acute angle.

The lower cover 60, which may be disposed on an outer (e.g., outermost) rear surface of the display device 1, may contain at least one of a plastic material, a metal material, or a glass material, and may include a color coating layer. In an embodiment, the lower cover 60 may be flat glass having a transparent, translucent, or opaque color coating layer.

In another embodiment, the lower cover 60 may have a substantially similar shape as that of the cover window 20, and may contain a glass material having a color coating layer. For example, the lower cover 60 according to another example may have a structure that is symmetrical to the cover window 20 with the middle frame 50 interposed therebetween, and may include a transparent, translucent, or opaque color coating layer.

The wearable portion BD may be a portion for fixing the main body unit BP to a user's wrist, or the like. For example, the wearable portion BD may be any one of a strap, a chain, or a bracelet.

Figure 2:
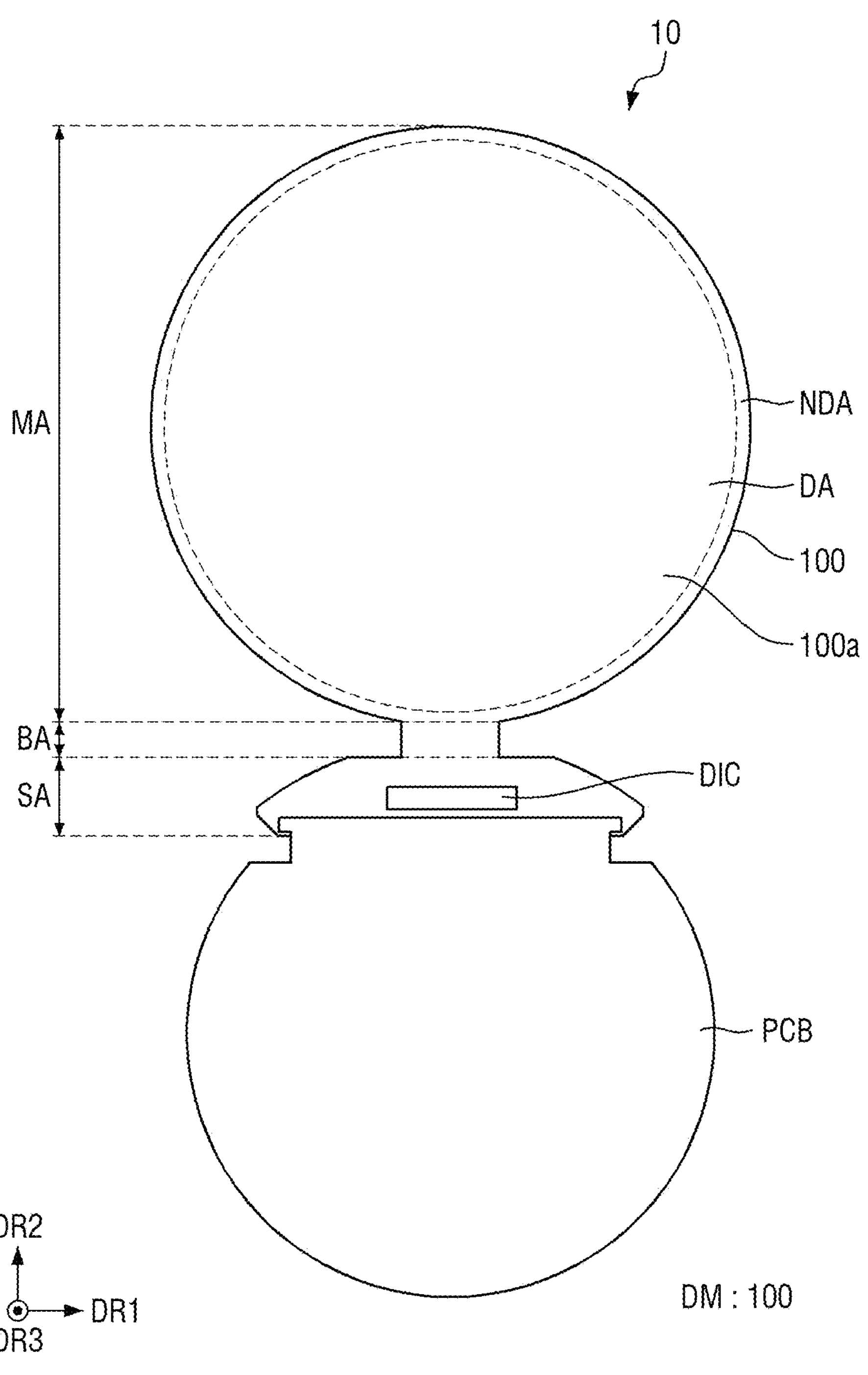
FIG. 2 is a front view showing a state in which a display driving module according to an embodiment is unfolded.
Figure 3:
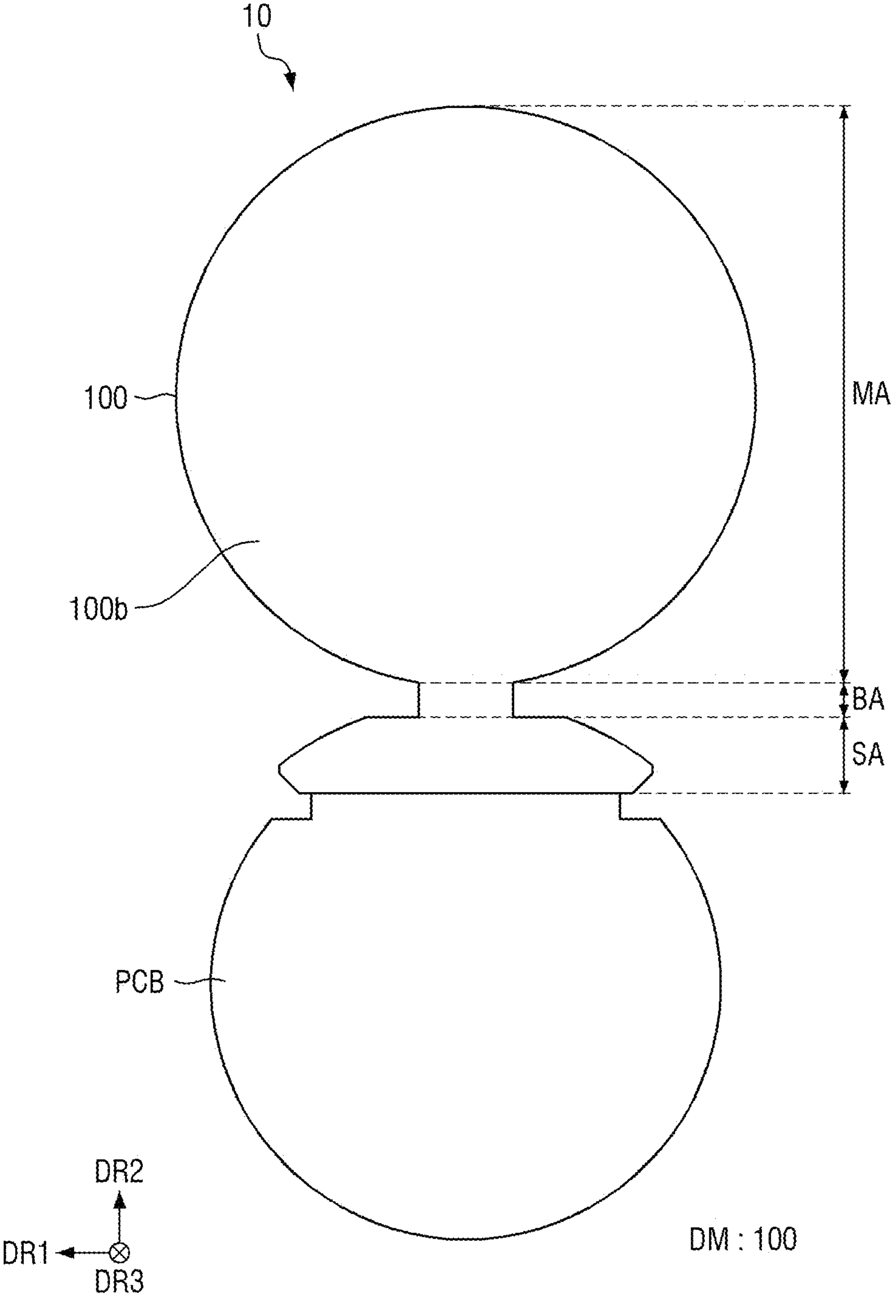
FIG. 3 is a rear view showing a state in which a display driving module according to an embodiment is unfolded.
Figure 4:
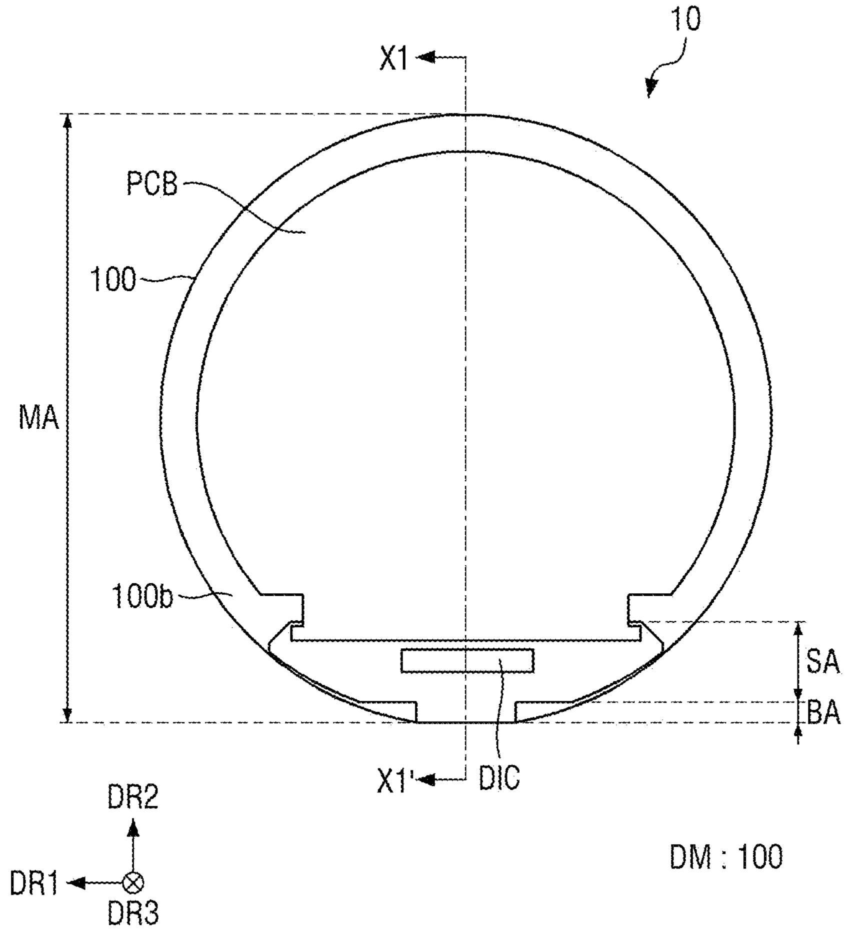
FIG. 4 is a rear view showing a state in which a display driving module according to an embodiment is bent.
Figure 5:
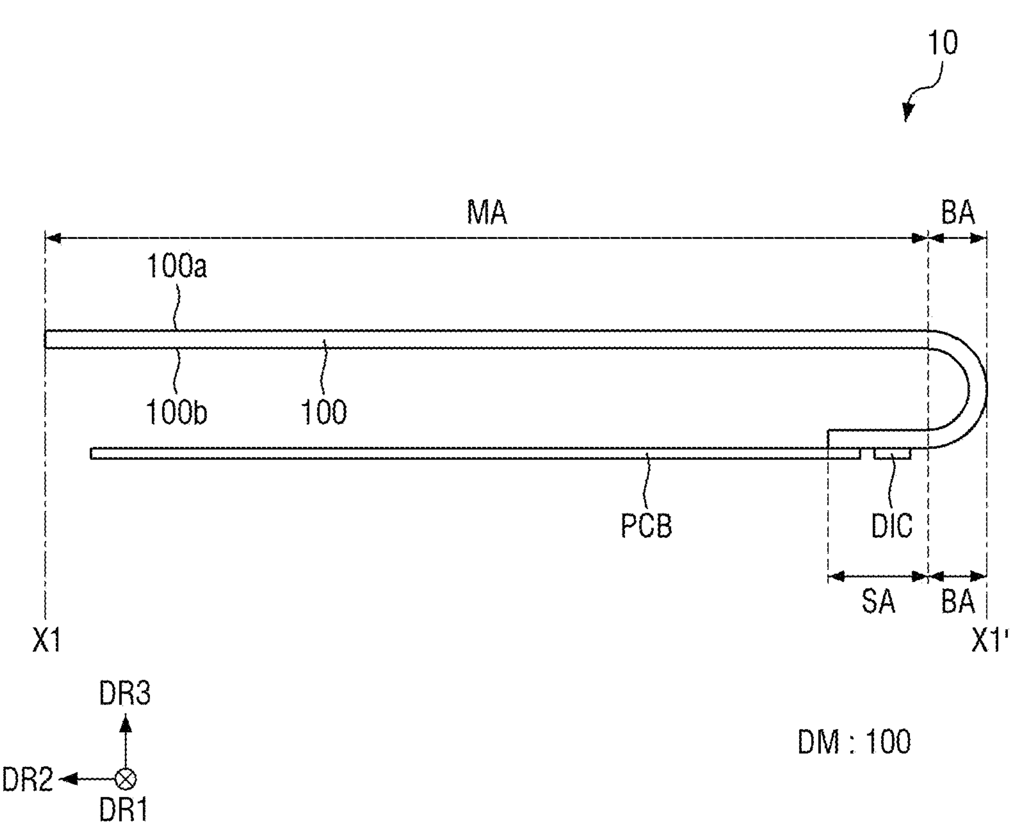
FIG. 5 is a schematic cross-sectional view taken along line X1-X1' of FIG. 4.

FIG. 2 is a front view showing a state in which a display driving module is unfolded according to an embodiment. FIG. 3 is a rear view showing a state in which a display driving module is unfolded according to an embodiment. FIG. 4 is a rear view showing a state in which a display driving module is bent according to an embodiment. FIG. 5 is a schematic cross-sectional view taken along line X1-X1' of FIG. 4.

Referring to FIGS. 2 to 5, the display driving module 10 may include a display module DM, a driving chip DIC, and a driving board PCB.

The display module DM may include the display panel 100. Examples of the display panel 100 may include an organic light emitting display panel, a micro LED display panel, a nano LED display panel, a quantum dot light emitting display panel, a liquid crystal display panel, a plasma display panel, a field emission display panel, an electrophoretic display panel, an electrowetting display panel, or the like. In the following description, a case where an organic light emitting display panel is applied as an example of the display panel 100 will be exemplified, but the present disclosure is not limited thereto, and other display panels may be applied within the scope of technical spirit.

The display panel 100 may include the display area DA and the non-display area NDA. The display area DA may refer to a portion that may display an image, and the non-display area NDA may refer to a portion that does not display the image.

The display area DA may have a circular shape in plan view. However, the present disclosure is not limited thereto, and the display area DA may have various shapes, such as a rectangular shape, a rectangular shape with rounded corners, a square shape, another polygonal shape, or an elliptical shape in plan view.

The non-display area NDA may be disposed around a periphery area of the display area DA. The non-display area NDA may be a bezel area. The non-display area NDA may surround the display area DA. However, the present disclosure is not limited thereto, and the non-display area NDA may not be disposed in at least a part of the peripheral area of the display area DA, for example.

In the non-display area NDA, signal lines or driving circuits for applying a signal to the display area DA (display area or touch area) may be disposed. In another embodiment, the non-display area NDA may include a part of the touch area, and a sensor member such as a force sensor or the like may be disposed in that region.

The display panel 100 may include a plurality of pixels disposed in the display area DA. The plurality of pixels may be arranged in a matrix. The shape of each pixel may be a rectangular shape or a square shape in plan view. However, the present disclosure is not limited thereto, and it may be a rhombic shape in which each side may be inclined with respect to the first direction DR1 or the second direction DR2. Each pixel may include an emission area. Each emission area may be the same as or different from the shape of the pixel. For example, when the shape of the pixel is a rectangular shape, the emission area of the corresponding pixel may have various shapes such as a rectangle, a rhombus, a hexagon, an octagon, or a circle.

In the illustrated figure, the first direction DR1 and the second direction DR2 cross each other as horizontal directions. For example, the first direction DR1 and the second direction DR2 may be orthogonal to each other. In addition, the third direction DR3 crosses the first direction DR1 and the second direction DR2, and may be, for example, perpendicular directions orthogonal to each other. In the present specification, directions indicated by arrows of the first direction DR1, the second direction DR2, and the third direction DR3 may be referred to as one side, and the opposite directions thereto may be referred to as the other side.

The display driving module 10 may further include a touch member that may detect a touch input. The touch member may be provided in the form of a touch layer TSL (see FIG. 6) disposed on the display panel 100. In this case, the touch layer TSL (see FIG. 6) may be provided integrally with the display panel 100. However, the present disclosure is not limited thereto, and the touch member may be provided as a separate panel or film from the display panel 100 and may be attached to the display panel 100. In an embodiment, a case where the touch member is provided in the form of the touch layer TSL (see FIG. 6) is exemplified, but the present disclosure is not limited thereto.

The touch area may be an area where a touch input may be detected. The touch area may overlap the display area DA. In other words, the display area DA may be a region where an image may be displayed and the touch input may be detected.

In some embodiments, the display panel 100 may include a flexible substrate containing a flexible polymer material such as polyimide or the like. Accordingly, the display panel 100 can be, for example, curved, bent, folded or rolled.

The display panel 100 may include a main region MA, a bending area BA, and a sub-region SA. The bending area BA may be disposed between the main region MA and the sub-region SA in the second direction DR2. For example, the bending area BA may connect an end portion of the main region MA and an end portion of the sub-region SA. The main region MA may be disposed on one side of the bending area BA in the second direction DR2. The sub-region SA may be disposed on the other side of the bending area BA in the second direction DR2.

The display area DA of the display panel 100 may be disposed in the main region MA. In an embodiment, the peripheral edge portion of the display area DA in the main region MA, the entire bending area BA, and the entire sub-region SA may correspond to the non-display area NDA. However, the present disclosure is not limited thereto, and the bending area BA and/or the sub-region SA may also include at least a portion of the display area DA.

The main region MA may have a shape substantially similar to an outer shape of the display driving module 10 in plan view. The main region MA may be a flat region located on one plane. However, the present disclosure is not limited thereto, and at least a part of the edge portion of the main region MA may be bent in the third direction DR3 to form a curved surface or may be bent in a vertical direction.

When at least a part of the edge portion of the main region MA is bent in the third direction DR3 to form a curved surface or is bent in the vertical direction, the display area DA may also be disposed at the corresponding edge portion.

However, the present disclosure is not limited thereto, and the non-display area that does not display an image may be disposed on the curved or bent edge portion. Alternatively, both the display area and the non-display area may be disposed thereon.

The bending area BA may be connected to the other side of the main region MA in the second direction DR2. For example, the bending area BA may be connected to the main region MA through a lower short side of the main region MA. The width of the bending area BA, for example, the width in the first direction DR1 may be smaller than the width of the main region MA adjacent to the bending area BA, for example, the width in the first direction DR1. A connection portion between the main region MA and the bending area BA may have an L-shaped cut portion, for example.

The bending area BA may be an area where the display panel 100 is bent. As shown in FIG. 4 and FIG. 5, the display panel 100 may be bent with a curvature downward in a thickness direction in the bending area BA. For example, the display panel 100 may be bent to the other side in the third direction DR3 in the bending area BA.

The bending area BA may have a constant radius of curvature. However, the present disclosure is not limited thereto, and the bending area BA may have a different radius of curvature for different sections thereof. The surface of the display panel 100 may be reversed as the display panel 100 is bent in the bending area BA. For example, as shown in FIG. 5, the display panel 100 may be bent in a direction opposite to a first surface 100*a* that is a display surface. Accordingly, in the second surface 100*b* opposite to the display surface, the second surface 100*b* at the main region MA and the second surface 100*b* at the sub-region SA may face itself in the third direction DR3.

The sub-region SA may be disposed on the other side of the bending area BA in the second direction DR2. The sub-region SA may extend from the bending area BA. The width of the sub-region SA, for example, the width in the first direction DR1 may be greater than the width of the bending area BA, for example, the width in the first direction DR1. A connection portion between the sub-region SA and the bending area BA may have an L-shaped cut portion.

In some embodiments, the size of the sub-region SA may be smaller than the size of the main region MA of the display panel 100. For example, as shown in FIG. 4, in a state where the display panel 100 is bent, the sub-region SA may completely overlap the main region MA. When the display panel 100 is bent, the outer part of the sub-region SA may be surrounded by the outer part of the main region MA in plan view. The outer part of the sub-region SA may be disposed inward from the outer part of the main region MA in plan view.

As shown in FIG. 5, in a state where the display panel 100 is bent, the sub-region SA may overlap the main region MA in the thickness direction of the display panel 100, that is, in the third direction DR3. The sub-region SA may be disposed under the main region MA in the third direction DR3.

The driving chip DIC may be disposed on the sub-region SA of the display panel 100. In some embodiments, the driving chip DIC may be disposed on the first surface 100*a* of the display panel 100 in the sub-region SA of the display panel 100. In an embodiment, the driving chip DIC may be directly mounted on the display panel 100 as illustrated in the drawings by a chip on glass (COG) or chip on plastic (COP) method. In another embodiment, the driving chip DIC may be mounted on a flexible film by a chip on film (COF) method.

The driving chip DIC may generate and output data voltages, power voltages, scan timing signals, or the like. The driving chip DIC may include an integrated circuit for driving the display panel 100. The integrated circuit may include a display integrated circuit and/or a touch unit integrated circuit. However, the present disclosure is not limited thereto, and the display integrated circuit and the touch unit integrated circuit may be provided as separate chips or may be provided as an integrated chip.

The driving board PCB may be disposed on an end portion of the sub-region SA of the display panel 100. A pad portion may be disposed at an end portion of the sub-region SA of the display panel 100. The pad portion may include a plurality of display signal wiring pads and touch signal wiring pads. The driving board PCB may be connected to the pad portion at an end portion of the sub-region SA of the display panel 100. The driving board PCB may be attached to the pad portion by using a conductive adhesive member such as an anisotropic conductive film or an anisotropic conductive adhesive. The driving board PCB may be a flexible printed circuit board or a flexible film, implemented as, for example, a chip on film.

In a state where the display panel 100 is bent, the driving chip DIC and the driving board PCB may be located on the opposite side of the display panel 100 of the main region MA with the display panel 100 of the sub-region SA interposed therebetween. That is, the driving chip DIC and the driving board PCB may be disposed on the first surface 100*a* of the sub-region SA, and may be located on the side distant from the main region MA in the third direction DR3 as the display panel 100 is bent.

In some embodiments, the size of the driving board PCB may be smaller than the size of the main region MA of the display panel 100. For example, as shown in FIG. 4, in a state where the display panel 100 is bent, the driving board PCB may completely overlap the main region MA of the display panel 100. In a state where the display panel 100 is bent, the outer part the driving board PCB may be surrounded by the outer part of the main region MA of the display panel 100 in plan view. The outer part of the driving board PCB may be disposed inward of the outer part of the main region MA of the display panel 100 in plan view.

The planar shape of the driving board PCB may be substantially similar to the planar shape of the display panel 100. For example, when the display panel 100 has a circular planar shape, at least a part of the driving board PCB may have a circular shape. However, the present disclosure is not limited thereto, and the shape of the driving board PCB may be variously modified.

Figure 6:
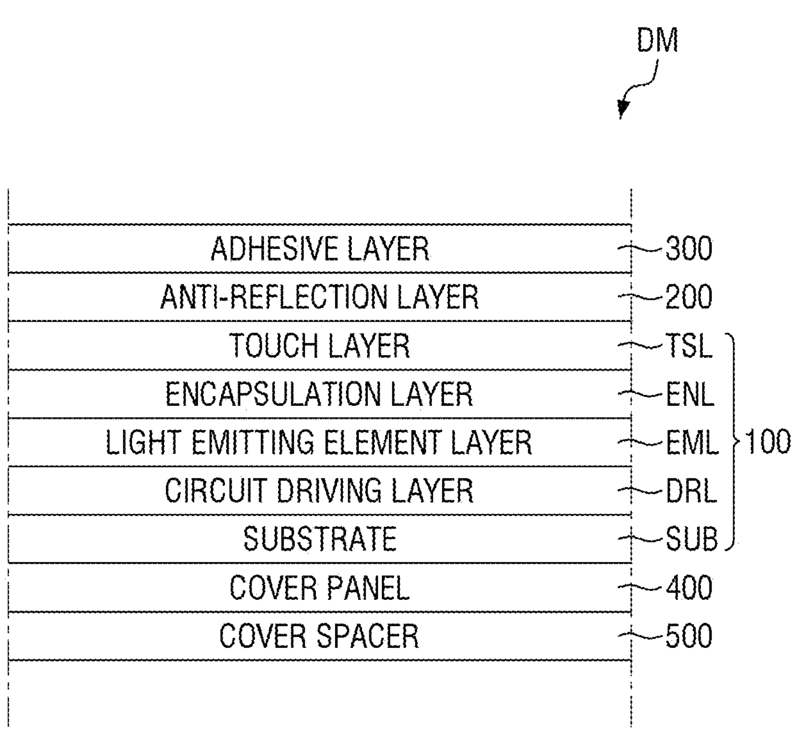
FIG. 6 is a schematic cross-sectional view illustrating an stacked structure of a display module according to an embodiment.

FIG. 6 is a schematic cross-sectional view illustrating an stacked structure of a display module according to an embodiment.

Referring to FIG. 6, the display module DM may include the display panel 100, an anti-reflection layer 200, an adhesive layer 300, a cover panel 400, and a cover spacer 500. The display panel 100 may include a substrate SUB, a circuit driving layer DRL, a light emitting element layer EML, an encapsulation layer ENL, and the touch layer TSL.

The substrate SUB may support one or more components disposed thereon. The substrate SUB may include a transparent material. For example, the substrate SUB may include a transparent insulating material such as glass, quartz, or the like. The substrate SUB may be a rigid substrate. However, it is not limited thereto, and the substrate SUB may include plastic such as polyimide or the like, and may have a flexible property such that it can be, for example, twisted, bent, folded, or rolled.

The circuit driving layer DRL may be disposed on a first surface of the substrate SUB, for example, a top surface of the substrate SUB. The circuit driving layer DRL may include a circuit that may drive the light emitting element layer EML of the pixel. The circuit driving layer DRL may include a plurality of thin film transistors.

The light emitting element layer EML may be disposed on the circuit driving layer DRL. The light emitting element layer EML may include an organic light emitting layer. The light emitting element layer EML may emit light with various luminance levels according to a driving signal transmitted from the circuit driving layer DRL.

The encapsulation layer ENL may be disposed on the light emitting element layer EML. The encapsulation layer ENL may include an inorganic layer or a laminated layer of an inorganic layer and an organic layer. As another example, the encapsulation layer ENL may include glass or an encapsulation film.

The touch layer TSL may be disposed on the encapsulation layer ENL. The touch layer TSL may be a layer for recognizing a touch input, and may function as a touch member. The touch layer TSL may include a plurality of sensing areas and sensing electrodes.

The anti-reflection layer 200 may be disposed on the display panel 100. The anti-reflection layer 200 may reduce reflection of external light. The anti-reflection layer 200 may be attached in the form of a polarizing film. In this case, the anti-reflection layer 200 may polarize light passing therethrough. However, the present disclosure is not limited thereto, and the anti-reflection layer 200 may be laminated in the form of a color filter layer. In this case, the anti-reflection layer 200 may include a color filter or the like for selectively transmitting light of a specific wavelength or range of wavelengths.

The adhesive layer 300 may be disposed on the anti-reflection layer 200. The adhesive layer 300 may adhere the cover window 20 (see FIG. 1) to the display panel 100 or the anti-reflection layer 200. In some embodiments, the adhesive layer 300 may be an optically clear adhesive (OCA) film or a pressure sensitive adhesive (PSA) film. Although it is illustrated in the drawings that the adhesive layer 300 is included in the display module DM, the present disclosure is not limited thereto. For example, the adhesive layer 300 may not be included in the display module DM, and may be provided together with the cover window 20 (see FIG. 1) and attached to the cover window 20 (see FIG. 1).

The cover panel 400 may be disposed on a second surface of the substrate SUB, for example, a bottom surface of the substrate SUB. The cover panel 400 may include at least one functional layer, which may perform a heat dissipation function, an electromagnetic shielding function, a buffering function, a strength enhancing function, a supporting function, and/or an adhesive function. For example, the functional layer of the cover panel 400 may be a sheet layer made of a sheet, a film layer made of a film, a thin film layer, a coating layer, a panel, a plate, or the like. A functional layer may include a single layer or a stack of multiple thin films or coating layers. The functional layer may be, for example, a supporting member, a heat dissipation layer, an electromagnetic shielding layer, an impact absorbing layer, a bonding layer, or the like.

The cover spacer 500 may be disposed on the cover panel 400. The cover spacer 500 may prevent the display driving module 10 from being bent due to an external force or may reduce a degree of bending of the display driving module 10. The cover spacer 500 may maintain the display driving module 10 in a relatively flat state in a case when an external force is applied.

The cover spacer 500 may include a rigid or semi-rigid material. Specifically, the cover spacer 500 may include a metal material such as stainless steel (SUS) or aluminum, or a polymer such as polymethyl methacrylate (PMMA), polycarbonate (PC), polyvinyl alcohol (PVA), acrylonitirle-butadiene-styrene (ABS), polyethylene terephthalate (PET), or the like.

Figure 7:
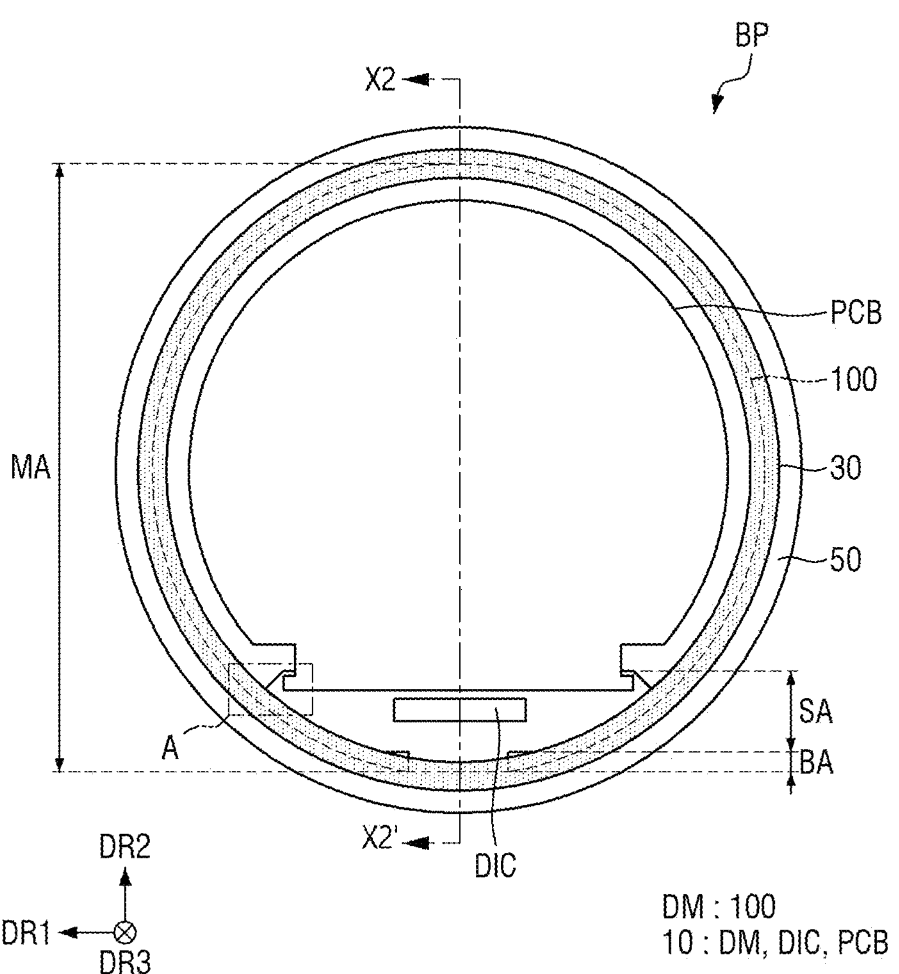
FIG. 7 is a schematic rear view showing a main body unit according to an embodiment.
Figure 8:
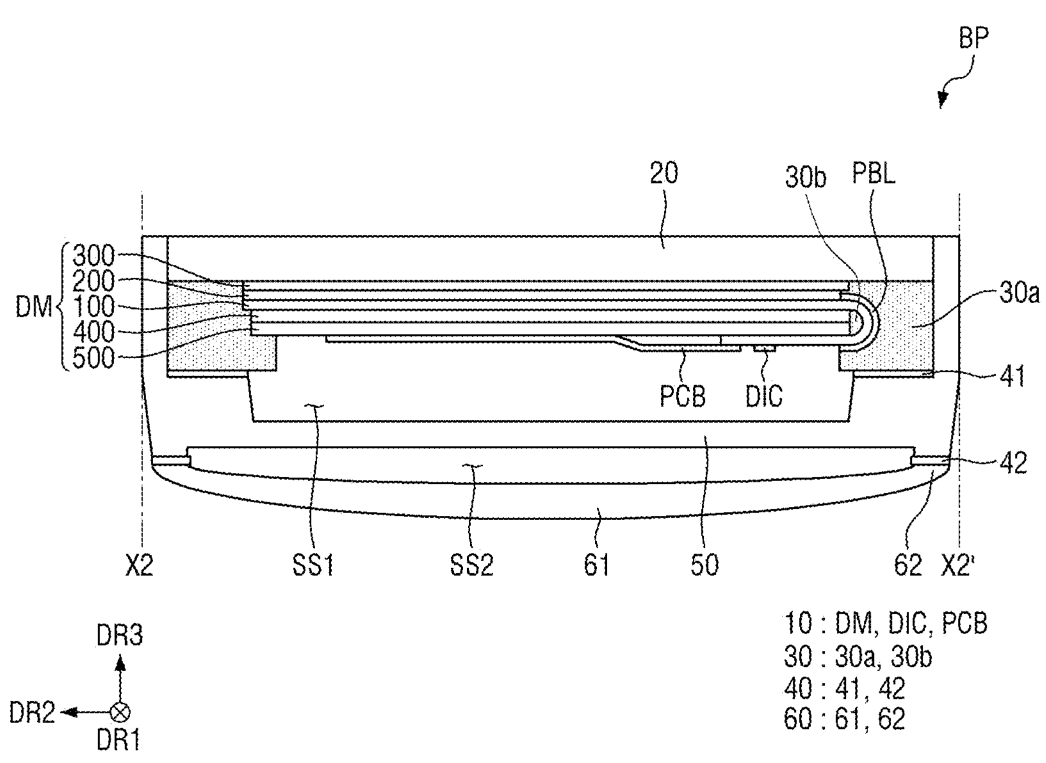
FIG. 8 is a cross-sectional view taken along line X2-X2' of FIG. 7.

FIG. 7 is a schematic rear view showing a main body unit according to an embodiment. FIG. 8 is a cross-sectional view taken along line X2-X2' of FIG. 7.

Referring to FIG. 7 and FIG. 8, the main body unit BP may include the display driving module 10, the cover window 20, the outer structure 30, the coupling member 40, the middle frame 50, and the lower cover 60, as described with reference to FIG. 1.

As described herein, for example, with reference to FIG. 2, the display driving module 10 may include the display module DM, the driving chip DIC, and the driving board PCB. As described with reference to FIG. 6, the display module DM may include the display panel 100, the anti-reflection layer 200, the adhesive layer 300, the cover panel 400, and the cover spacer 500.

Since the display module DM, the driving chip DIC, and the driving board PCB of the display driving module 10, and the display panel 100, the anti-reflection layer 200, the adhesive layer 300, the cover panel 400, and the cover spacer 500 of the display module DM have been described herein, a repeating description may be omitted.

The cover spacer 500 may compensate for a height difference formed between the sub-region SA of the display panel 100 and the cover panel 400, and a height difference formed between the driving board PCB and the cover panel 400. For example, the cover spacer 500 may be disposed between the sub-region SA of the display panel 100 and the cover panel 400, and between the driving board PCB and the cover panel 400 in the third direction DR3, so that the sub-region SA of the display panel 100 and the driving board PCB may be maintained in a flat state. In some embodiments, the sub-region SA of the display panel 100 and the driving board PCB may be attached to the bottom portion of the cover spacer 500 by a separate adhesive member. Accordingly, the sub-region SA of the display panel 100 and the driving board PCB may maintain a fixed state.

The display module DM may further include a bending protection layer PBL. The bending protection layer PBL may be disposed on a partial area of the display panel 100. In an embodiment, the bending protection layer PBL may be disposed on the bending area of the display panel 100. However, the present disclosure is not limited thereto, and the bending protection layer PBL may be disposed on the area other than the bending area BA.

The bending protection layer PBL may be made of a polymer compound such as polyimide, acrylate, epoxy, or the like. The bending protection layer PBL may inhibit or prevent the occurrence of cracks due to stress that may be applied to the display panel 100 when the display panel 100 is bent. Further, the bending protection layer PBL may inhibit or block the propagation of the cracks. Accordingly, the durability of the display module DM may be improved.

The cover window 20 may be attached to the display driving module 10 by the adhesive layer 300 of the display module DM. The size of the cover window 20 may be greater than the size of the display driving module 10. Thus, the cover window 20 may protrude outward from a periphery of the display driving module 10.

The outer structure 30 may be disposed between the cover window 20 and the middle frame 50 in the third direction DR3. As shown in FIG. 7, the outer structure 30 may surround the display driving module 10 in plan view. As shown in FIG. 8, the outer structure 30 may surround the display driving module 10 in the horizontal direction defined by the first direction DR1 and the second direction DR2. As shown in FIG. 7, the outer structure 30 may be surrounded by a vertical projection of the middle frame 50 in plan view. The vertical projection of the middle frame 50 may extend in the third direction DR3 from a horizontal portion of the middle frame 50 extending substantially parallel to the display driving module 10. The vertical projection of the middle frame 50 may have an inner sidewall facing inward toward the display driving module 10 and an outer sidewall facing to an exterior of the main body unit BP. The outer structure 30 may be surrounded by the vertical projection of the middle frame 50 in plan view. As shown in FIG. 8, the outer structure 30 may be surrounded by the inner sidewall of the middle frame 50 in the horizontal direction defined by the first direction DR1 and the second direction DR2.

As shown in FIG. 8, the outer structure 30 may be disposed between the display driving module 10, the cover window 20, the coupling member 40, and the middle frame 50. The outer structure 30 may couple the display driving module 10, the cover window 20, the coupling member 40, and the middle frame 50.

Referring to the outer structure 30 located on the left side of the drawing, the outer structure 30 may be disposed in the space defined by a first end portion (for example, an end portion adjacent to the main region) of the display driving module 10, the inner surface of the cover window 20, the inner sidewall of the middle frame 50, and the top surface of a first coupling member 41. For example, an inner surface of the outer structure 30 may be in direct contact with an outer part of the display driving module 10, a top surface of the outer structure 30 may be in direct contact with an inner surface of the cover window 20, an outer surface of the outer structure 30 may be in direct contact with the inner sidewall of the middle frame 50, and at least a part of a bottom surface of the outer structure 30 may be in direct contact with the top surface of the first coupling member 41. Here, the first coupling member 41 may be disposed on a portion of the middle frame 50.

In some embodiments, the outer structure 30 may overlap the display driving module 10 in the third direction DR3. At least a part of the outer structure 30 may be disposed under the display driving module 10. The at least a part of the outer structure 30 may cover at least a part of the lower portion of the display driving module 10. For example, at least a part of the outer structure 30 may be in contact with the bottom surface of the cover spacer 500.

Referring to the outer structure 30 located on the right side of the drawing, the outer structure 30 may be disposed in the space defined by a second end portion (for example, an end portion adjacent to the bending area) of the display driving module 10, the inner surface of the cover window 20, the inner sidewall of the middle frame 50, and the top surface of the first coupling member 41. For example, the inner surface of the outer structure 30 may be in direct contact with the outer part of the display driving module 10 adjacent to the bending area BA, the top surface of the outer structure 30 may be in direct contact with the inner surface of the cover window 20, the outer surface of the outer structure 30 may be in direct contact with the inner sidewall of the middle frame 50, and at least a part of the bottom surface of the outer structure 30 may be in direct contact with the top surface of the first coupling member 41.

Although the first end portion and the second end portion of the display driving module 10 are illustrated in FIG. 8, as described above, the outer structure 30 may be disposed in the space defined by the outer part of the display driving module 10, the inner surface of the cover window 20, the inner sidewall of the middle frame 50, and the top surface of the first coupling member 41 to surround the display driving module 10. Accordingly, the outer structure 30 may have an annular shape with a central hole, that is, a donut shape or a ring shape in plan view.

In the display device 1 according to an embodiment, since the outer structure 30 is disposed in the space defined by the outer part of the display driving module 10, the inner surface of the cover window 20, the inner sidewall of the middle frame 50, and the top surface of the first coupling member 41, an attachment area of the first coupling member 41 may be expanded, which may improve the coupling force between the middle frame 50 and the cover window 20. Accordingly, the attachment surface of the first coupling member 41 may be sufficiently secured by the outer structure 30, and the attachment tolerance for coupling the cover window 20 and the middle frame 50 may be reduced. When the attachment tolerance for coupling the cover window 20 and the middle frame 50 is reduced, a dead space between the middle frame 50 and the display driving module 10 may be reduced. Further, since the outer structure 30 having a certain level of elasticity and strength may be disposed in the space defined by the outer part of the display driving module 10, the inner surface of the cover window 20, the inner sidewall of the middle frame 50, and the top surface of the first coupling member 41, the impact resistance of the display device 1 may be improved.

In some embodiments, the outer structure 30 may include an outer portion 30*a* and an inner portion 30*b*.

The outer portion 30*a* may be disposed outward from the outer part of the display driving module 10. For example, the outer portion 30*a* may be in direct contact with the outer surface of the bending protection layer PBL, the inner surface of the cover window 20, the inner sidewall of the middle frame 50, and the top surface of the first coupling member 41.

The inner portion 30*b* may be disposed at the inner side of the bending area BA of the display panel 100. For example, the inner portion 30*b* may be in direct contact with the rear surface of the display panel 100, the side surface of the cover panel 400, and the side surface of the cover spacer 500 in the bending area BA of the display panel 100. In an embodiment, the inner portion 30*b* may be formed in a space formed by the bending area BA. The inner portion 30*b* may be formed to fill the entire space formed by the bending area BA. The inner portion 30*b* may maintain the bending state of the display panel 100.

The coupling member 40 may include the first coupling member 41 and a second coupling member 42. The coupling member 40 may be an adhesive tape having an adhesive material applied to sides thereof and having a waterproof or dustproof function. The first coupling member 41 and the second coupling member 42 may include the same material, but the present disclosure is not limited thereto.

The first coupling member 41 may be disposed on the top surface of the middle frame 50. The first coupling member 41 may be disposed on the top surface of the horizontal portion of the middle frame 50 extending substantially parallel to the display driving module 10. The horizontal portion of the middle frame 50 may have a stepped structure, and may a lower top surface disposed at a level below a level of the top surface of the middle frame 50. The top surface of the middle frame 50 may be a peripheral portion disposed around the lower top surface of the middle frame 50.

The first coupling member 41 may be disposed between the middle frame 50 and the outer structure 30 in the third direction DR3. For example, the first coupling member 41 may couple the top surface of the middle frame 50 and the bottom surface of the outer structure 30. The first coupling member 41 may be in direct contact with the outer structure 30.

The second coupling member 42 may be disposed on the bottom surface of the middle frame 50. The second coupling member 42 may be disposed between the middle frame 50 and the lower cover 60 in the third direction DR3. For example, the second coupling member 42 may couple the bottom surface of the middle frame 50 and the top surface of the peripheral portion 62 of the lower cover 60.

The middle frame 50 may function as a bracket for fixing the cover window 20 and the lower cover 60.

The display driving module 10 may be disposed between the middle frame 50 and the cover window 20. The horizontal portion of the middle frame 50 including the top surface of the middle frame 50 and the bottom surface of the display driving module 10 may face each other. The top surface of the middle frame 50 and the bottom surface of the display driving module 10 may be spaced apart from each other. A first storage space SS1 may be disposed between the lower top surface of the middle frame 50 and the bottom surface of the display driving module 10. The first storage space SS1 may provide a space for peripheral circuits of electronic devices, such as a host driving system, a memory, or a battery.

The lower cover 60 may be disposed under the middle frame 50. For example, a top surface of the lower cover 60 may face the bottom surface of the middle frame 50. At least a part of the top surface of the lower cover 60 may be disposed to be spaced apart from at least a part of the bottom surface of the middle frame 50. A second storage space SS2 may be disposed between at least a part of the top surface of the lower cover 60 and at least a part of the bottom surface of the middle frame 50. For example, one or more of the middle frame 50 and the lower cover 60 may have a recess portion. As illustrated in FIG. 8, the middle frame 50 and the lower cover 60 each include a recess portion, which face each other and form the second storage space SS2. The second storage space SS2 may provide a space for storing peripheral circuits of electronic devices that are not disposed in the first storage space SS1.

In some embodiments, the lower cover 60 may include a central cover portion 61 and a peripheral portion 62.

The central cover portion 61 may be disposed under the middle frame 50. The second storage space SS2 may house one or more peripheral circuits in a space formed between the top surface of the central cover portion 61 and the bottom surface of the middle frame 50. In some embodiments, the second storage space SS2 may enclose a battery for providing power to the display device 1.

The peripheral portion 62 may be located on a side surface of the central cover portion 61. The extension direction of the peripheral portion 62 may be different from the extension direction of the central cover portion 61. For example, the peripheral portion 62 may extend in the third direction DR3. The peripheral portion 62 may be supported by the middle frame 50. In an embodiment, the peripheral portion 62 may be coupled to the middle frame 50 by the second coupling member 42. Accordingly, the waterproof performance of the display device 1 may be improved, and the permeation of foreign substances may be prevented.

In another embodiment, the lower cover 60 may be detachably coupled to the middle frame 50. For example, the second coupling member 42 between the middle frame 50 and the peripheral portion 62 may be omitted, and mechanical coupling may be adopted. In this case, a battery replacement may be achieved by removing the lower cover 60 of the display device 1, and the display device 1 may be disassembled for repair.

Figure 9:
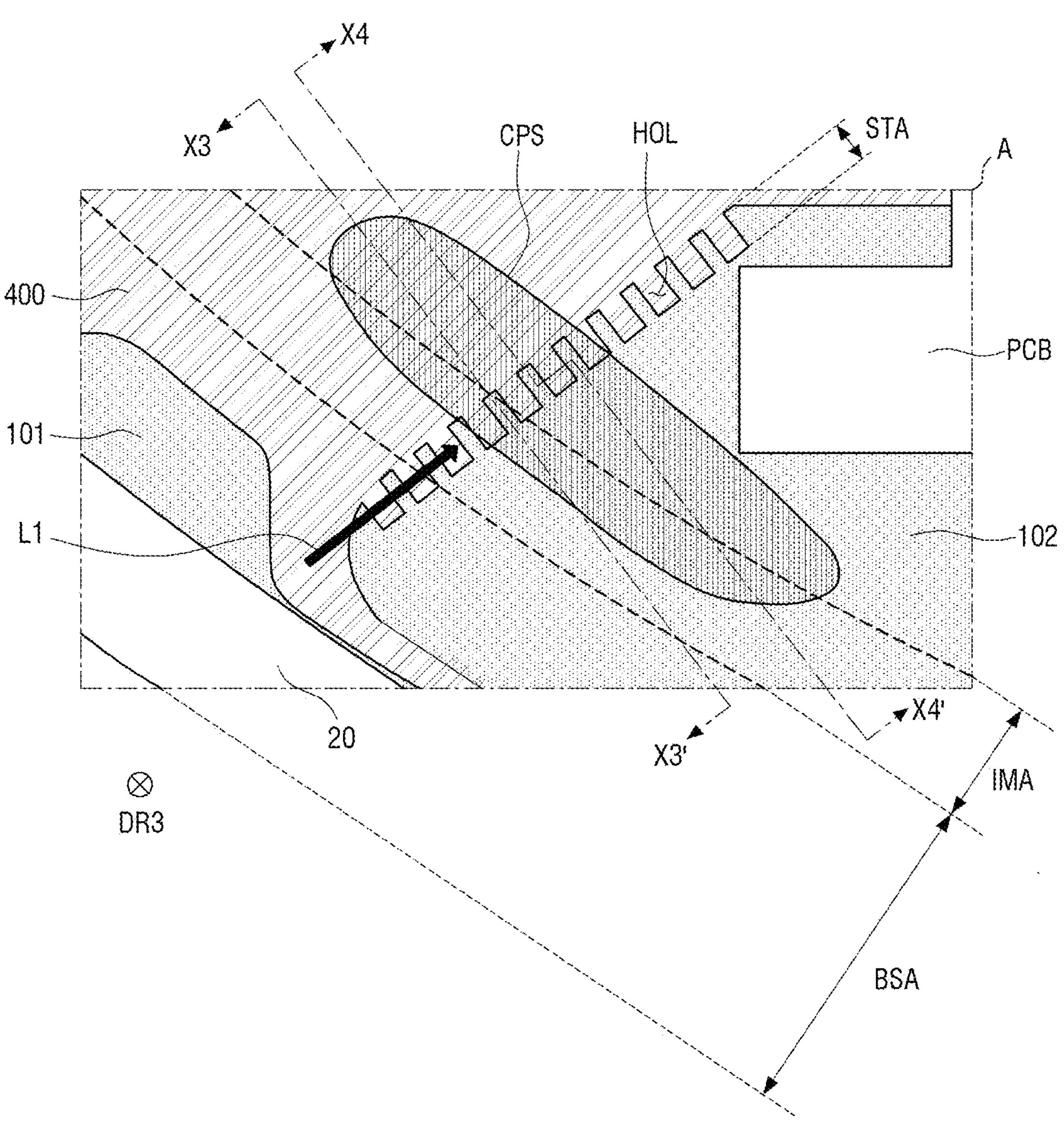
FIG. 9 is an enlarged view of area A of FIG. 7.
Figure 10:
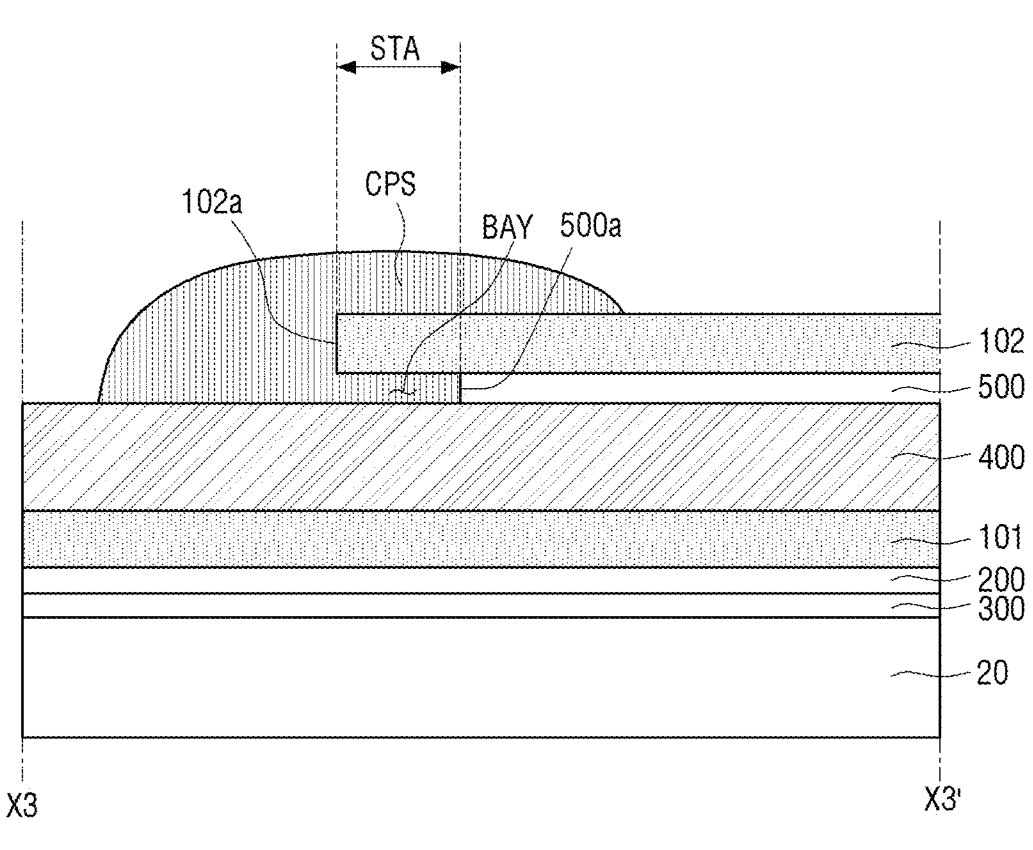
FIG. 10 is a cross-sectional view taken along line X3-X3' of FIG. 9.
Figure 11:
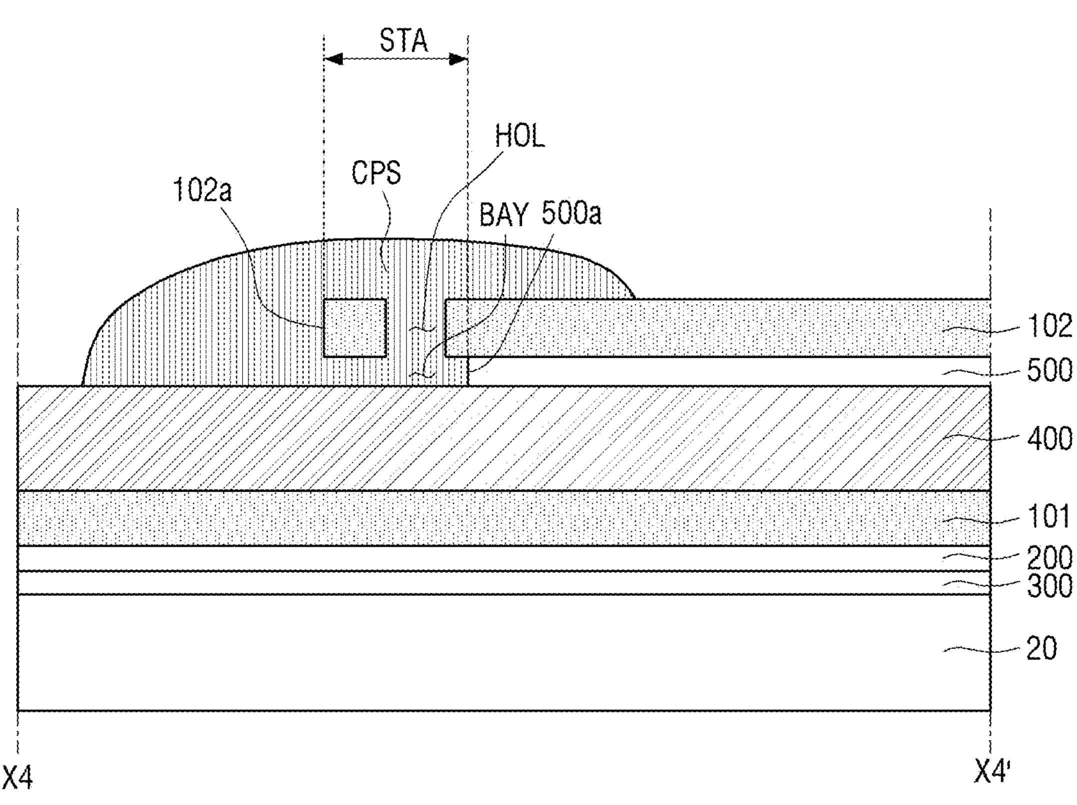
FIG. 11 is a cross-sectional view taken along line X4-X4' of FIG. 9.

FIG. 9 is an enlarged view of area A of FIG. 7. FIG. 10 is a cross-sectional view taken along line X3-X3' of FIG. 9. FIG. 11 is a cross-sectional view taken along line X4-X4' of FIG. 9.

In FIGS. 9 to 11, for simplicity of description, only the display driving module 10 and the cover window 20 are illustrated. Other components, such as the outer structure 30 may be omitted from the drawings.

Referring to FIGS. 9 to 11 in addition to FIG. 7 and FIG. 8, the display panel 100 may include a first portion 101 and a second portion 102 located on opposite sides with the cover panel 400 and/or the cover spacer 500 interposed therebetween in the third direction DR3. The first portion 101 of the display panel 100 may be disposed in the main region MA (see FIG. 5), and the second portion 102 of the display panel 100 may be disposed in the sub-region SA (see FIG. 5).

An edge portion **102*a* of the second portion 102 of the display panel 100 may protrude beyond an edge portion 500*a* of the cover spacer 500. While the edge portion 102*a* of the second portion 102 of the display panel 100 and the edge portion 500*a* of the cover spacer 500, which are shown on cross sections taken along lines X3-X3' and X4-X4', are illustrated in FIG. 10 and FIG. 11, embodiments are not limited thereto. For example, in some embodiments, all end portions of the second portion 102 of the display panel 100 may protrude beyond all end portions of the cover spacer 500, or some end portions of the second portion 102 of the display panel 100 may protrude beyond some end portions of the cover spacer 500**.

A recessed portion BAY may be disposed between the cover panel 400 and a portion where the second portion 102 of the display panel 100 protrudes beyond the cover spacer 500. For example, the edge portion **500*a* of the cover spacer 500 may be disposed below a lower surface of the second portion of the display panel 100. The edge portion 102*a* of the second portion of the first display panel 100 may extend beyond the edge portion 500*a* of the cover spacer 500. For example, the recessed portion BAY may be an undercut area below the second portion 102 of the first display panel 100. Here, the edge portion 500*a* of the cover spacer 500 may defining an end of the recessed portion BAY. The recessed portion BAY may be a space recessed from the edge portion 102*a* of the second portion 102 of the first display panel 100 toward the edge portion 500*a* of the cover spacer 500 in the horizontal direction defined by the first direction DR1 and the second direction DR2. A reverse step may be disposed between the second portion 102 of the display panel 100 and the cover spacer 500** by the recessed portion BAY.

The display device 1 may include a step area STA. The step area STA may refer to an area where the reverse step is formed. For example, the step area STA may be an area in which a first end portion of the second portion 102 may be disposed. Although it is illustrated in FIG. 9 that the step area STA extends in a diagonal direction, the present disclosure is not limited thereto.

In the display device 1 according to an embodiment, the display driving module 10 may further include a step compensation portion CPS.

The step compensation portion CPS may be disposed on the cover panel 400, the cover spacer 500, and the second portion 102 of the display panel 100. The step compensation portion CPS may overlap the recessed portion BAY in the third direction DR3. The step compensation portion CPS may be filled in the recessed portion BAY (see FIG. 10).

In some embodiments, the step compensation portion CPS may cover at least a portion of the top surface of the cover panel 400, the edge portion 500*a* of the cover spacer 500, and the edge portion 102*a* and the top surface of the second portion 102 of the display panel 100. For example, the step compensation portion CPS may encapsulate the first end portion of the second portion 102. However, the present disclosure is not limited thereto, and the step compensation portion CPS may not be in contact with the side surface or the top surface of the second portion 102 of the display panel 100.

In some embodiments, the step compensation portion CPS may contain resin. For example, the step compensation portion CPS may be made of optically clear resin (OCR), but is not limited thereto. The step compensation portion CPS may be applied in a liquid or paste state on the cover panel 400, the cover spacer 500, and the second portion 102 of the display panel 100. For example, the step compensation portion CPS may be formed by applying paste to overlap the recessed portion BAY in the third direction DR3. Thereafter, the step compensation portion CPS may be formed by curing the paste using ultraviolet rays or heat. The formation process of the step compensation portion CPS is described herein, for example, with reference to FIG. 16.

The step compensation portion CPS may compensate for the reverse step formed by the recessed portion BAY.

More specifically, the display device 1 according to an embodiment may include an outer structure arrangement area BSA and an inner mold contact area IMA.

The outer structure arrangement area BSA may be an area where the outer structure 30 may be disposed. In FIGS. 9 to 11, the outer structure 30 is not illustrated in order to show the outer structure arrangement area BSA. The outer structure arrangement area BSA may overlap the display driving module 10 and the cover window 20 in the third direction DR3.

The inner mold contact area IMA may be disposed at an inner side of the outer structure arrangement area BSA. The inner mold contact area IMA may be an area where an inner mold 3000 (see FIG. 22) is in contact with the display driving module 10 in a display device manufacturing method S1 (see FIG. 16) described herein. The inner mold contact area IMA and the outer structure arrangement area BSA may be disposed side by side without being spaced apart from each other (see FIG. 9).

In the display device manufacturing method S1 (see FIG. 16) described herein, the inner mold 3000 (see FIG. 22) may be disposed on the inner mold contact area IMA and may isolate the outer structure arrangement area BSA and the area disposed at the inner side of the inner mold contact area IMA from each other.

However, in the area where the inner mold contact area IMA and the step area STA overlap, the inner mold 3000 (see FIG. 22) may not completely seal the recessed portion BAY. Accordingly, the display device 1 according to an embodiment includes the step compensation portion CPS that may compensate for the reverse step of the recessed portion BAY. The step compensation portion CPS may contain the second paste PST2 at the outer structure arrangement area BSA. For example, the step compensation portion CPS may inhibit or prevent a second paste PST2 (see FIG. 23) for forming the outer structure 30 from permeating from the outer structure arrangement area BSA into the inner area of the inner mold contact area IMA through a first permeation path L1.

In some embodiments, the step compensation portion CPS may at least partially overlap the area where the inner mold contact area IMA and the step area (STA) overlap. For example, the step compensation portion CPS may cover the portion where the inner boundary of the inner mold contact area IMA and the step area STA overlap in the third direction DR3. Accordingly, the step compensation portion CPS may be disposed to inhibit or prevent the second paste PST2 (see FIG. 23) from permeating into the inner area of the inner mold contact area IMA.

Although it is illustrated in the drawings that the step compensation portion CPS has a water drop shape, the present disclosure is not limited thereto. The shape of the step compensation portion CPS may be variously modified. Further, although it is illustrated that the step compensation portion CPS extends in a diagonal direction intersecting the extension direction of the step area STA, the present disclosure is not limited thereto. For example, the step compensation portion CPS may have various shapes, such as a circular shape, a quadrilateral shape, or the like, depending on an application method.

When the paste is applied vertically in the third direction DR3 to form the step compensation portion CPS, the paste may permeate into the recessed portion BAY. The permeation of the paste into the recessed portion BAY may be incomplete depending on a width of the recessed portion BAY. For example, the protrusion of the second portion 102 of the display panel 100 located on the recessed portion BAY serves as an eave, which may overhang the cover spacer 500, and the paste may not completely permeate into the recessed portion BAY.

In the display device 1 according to an embodiment, the second portion 102 of the display panel 100 may include a through hole HOL. The paste for forming the step compensation portion CPS may effectively permeate into the recessed portion BAY at least partially through the through hole HOL.

For example, the through hole HOL may be a hole penetrating the second portion 102 of the display panel 100 in the third direction DR3. The through hole HOL may be a hole penetrating the top surface and the bottom surface of the second portion 102 of the display panel 100 in the third direction DR3. For example, the through hole HOL may penetrate entirely through the second portion 102 of the display panel 100. The through hole HOL may be disposed in the step area STA. The through hole HOL may overlap the recessed portion BAY in the third direction DR3. For example, the through hole HOL may expose at least a portion of the recessed portion BAY. The step compensation portion CPS may overlap the through hole HOL in the third direction DR3.

In an embodiment, as shown in FIG. 9, the through hole HOL may include a plurality of holes arranged along an extension direction of the step area STA, which is substantially perpendicular to a depth of the step area STA indicated by the double-ended arrow in the drawing. The plurality of holes may be arranged to be spaced apart from each other along the edge portion 102*a* of the second portion 102. In some embodiments, as shown in FIG. 9, each of the plurality of holes may have a quadrilateral shape in plan view.

In an embodiment, the through hole HOL may be disposed directly at the edge portion 102*a* of the second portion 102 of the display panel 100 located in the step area STA. For example, the through hole HOL may have a structure that is recessed inward from the edge portion 102*a* of the second portion 102 of the display panel 100. Accordingly, the edge portion 102*a* of the second portion 102 of the display panel 100 may have, for example, a combed shape or saw-toothed shape.

In the display device 1 according to an embodiment, the second portion 102 of the display panel 100 may include the through hole HOL, so that the paste for forming the step compensation portion CPS may effectively permeate into the recessed portion BAY. Further, ultraviolet rays and heat for curing the paste may effectively permeate into the paste located in the recessed portion BAY through the through hole HOL, and an under-curing of the paste may be prevented.

Hereinafter, one or more embodiments of the display device will be described. The same reference numbers indicate the same components throughout the present disclosure. Redundant descriptions thereof may be omitted.

Figure 12:
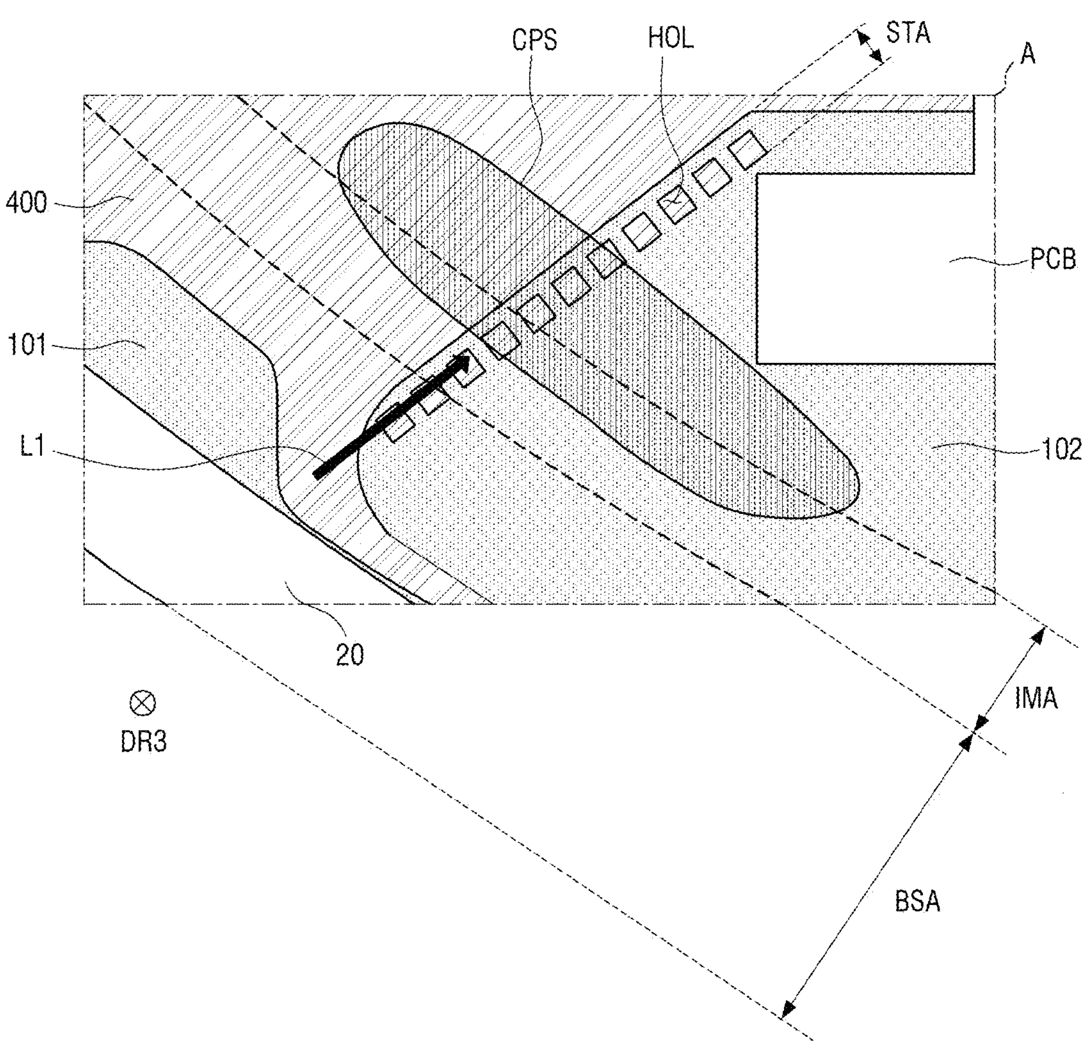
FIG. 12 is an enlarged view of area A of a main body unit according to another embodiment.
Figure 13:
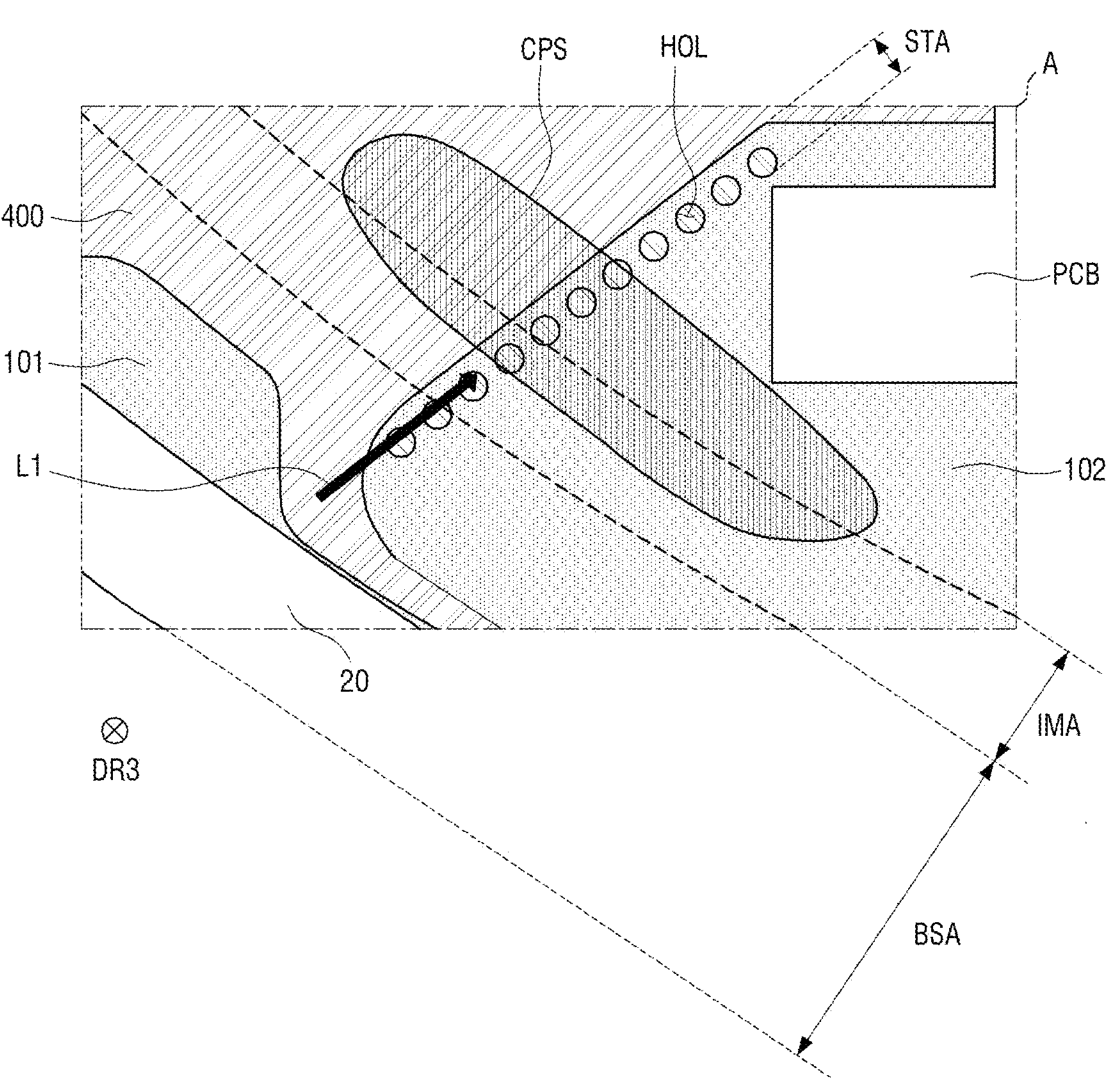
FIG. 13 is an enlarged view of area A of a main body unit according to still another embodiment.
Figure 14:
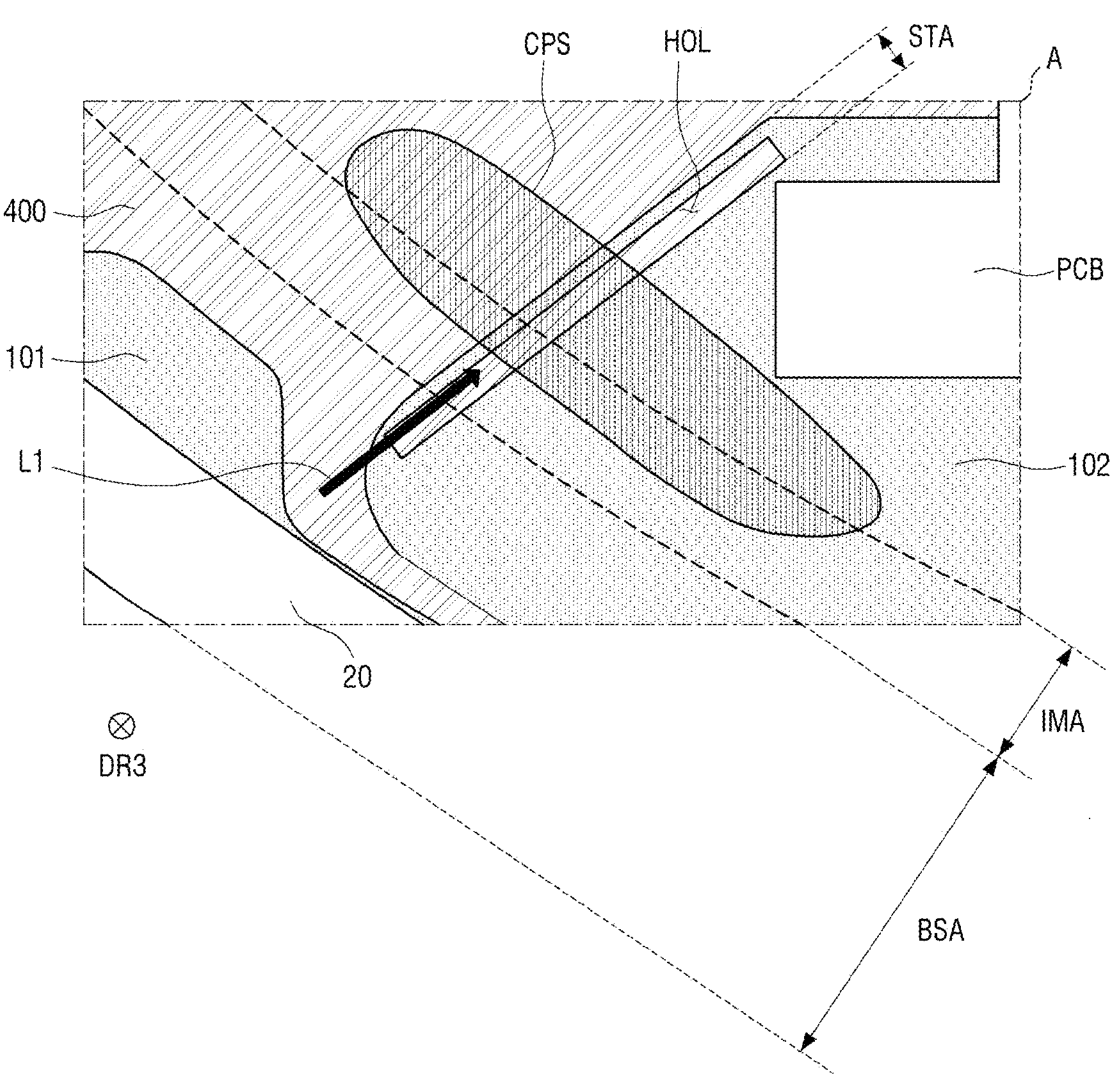
FIG. 14 is an enlarged view of area A of a main body unit according to further still another embodiment.
Figure 15:
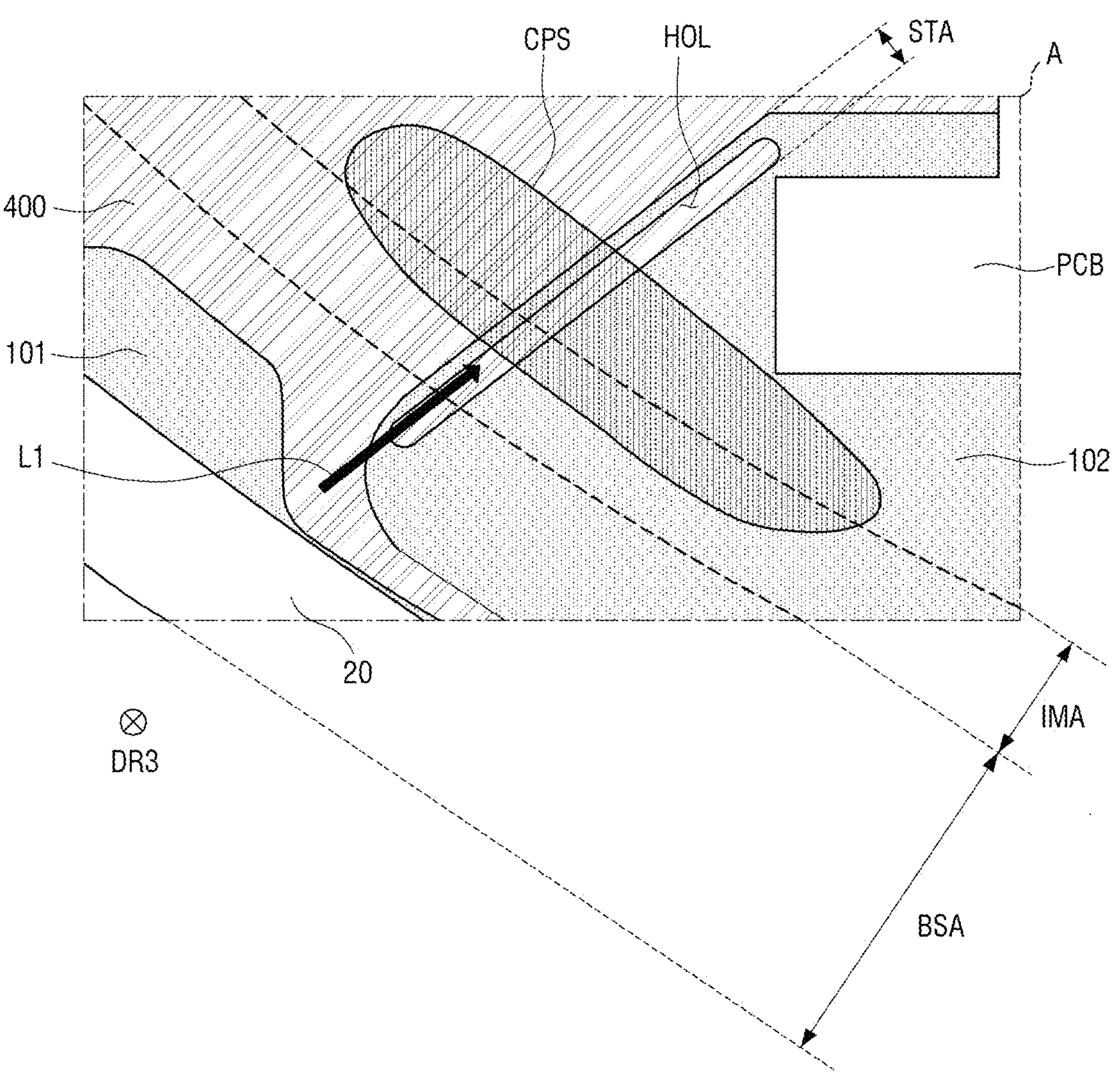
FIG. 15 is an enlarged view of area A of a main body unit according to further still another embodiment.

FIG. 12 is an enlarged view of area A of a main body unit according to another embodiment. FIG. 13 is an enlarged view of area A of a main body unit according to still another embodiment. FIG. 14 is an enlarged view of area A of a main body unit according to further still another embodiment. FIG. 15 is an enlarged view of area A of a main body unit according to further still another embodiment.

Referring to FIGS. 12 to 15, the display device 1 according to an embodiment is different from the display device 1 according to an embodiment described with reference to FIG. 9 or the like in that the through hole HOL may be spaced apart from the end of the second portion 102 of the display panel 100.

More specifically, the through hole HOL may be disposed to be spaced apart from the edge portion 102*a* of the second portion 102 of the display panel 100 located in the step area STA at a first end portion of the second portion 102. For example, the through hole HOL may be disposed in an island shape while being spaced apart from the edge portion 102*a* of the second portion 102 of the display panel 100. Accordingly, the edge portion 102*a* of the second portion 102 of the display panel 100 may have a ladder shape.

Meanwhile, in an embodiment, as shown in FIG. 12 and FIG. 13, the through hole HOL may include a plurality of holes arranged along the extension direction of the step area STA. The plurality of holes arranged along the extension direction of the step area STA may be disposed linearly or with an offset between at least some adjacent ones of the holes. The plurality of holes may be arranged to be spaced apart from each other in the extension direction of the step area STA.

In some embodiments, as shown in FIG. 12, each of the plurality of holes may have a quadrilateral shape in plan view. In another embodiment, as shown in FIG. 13, each of the plurality of holes may have a circular shape in plan view. As described above, the shape of each of the plurality of holes is not limited to a quadrilateral shape or a circular shape, and may be modified in various shapes such as a rhombic shape, an elliptical shape, or the like.

In another embodiment, as shown in FIG. 14 and FIG. 15, the through hole HOL may be disposed as a single hole extending along the extension direction of the step area STA.

In some embodiments, as shown in FIG. 14, the single hole may have a rectangular shape. In another embodiment, as shown in FIG. 15, the single hole may have a rectangular shape with both rounded ends. As described above, the shape of the single hole is not limited to a rectangular shape or a rectangular shape with rounded ends, and may be modified in various shapes such as an elliptical shape, a parallelogram shape, a trapezoidal shape, or the like.

Although not shown in the drawings, even in the case of the display device 1 according to an embodiment described herein, for example, with reference to FIG. 9, the shape of each of the plurality of holes may be modified in various shapes such as a circular shape, a rhombic shape, or the like other than a quadrilateral shape.

Hereinafter, an apparatus for manufacturing a display device according to an embodiment and a method for manufacturing a display device according to an embodiment will be described.

Figure 16:
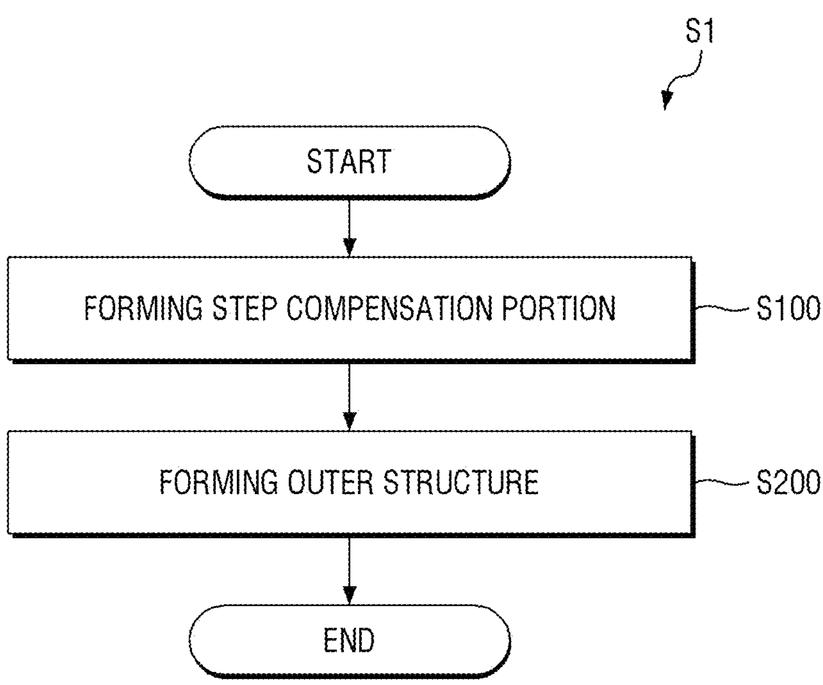
FIG. 16 is a flowchart showing a method for manufacturing a display device according to an embodiment.

FIG. 16 is a flowchart showing a method for manufacturing a display device according to an embodiment.

Referring to FIG. 16, the display device manufacturing method S1 according to an embodiment may include forming a step compensation portion (step S100) and forming an outer structure (step S200). Hereinafter, the step S100 of forming the step compensation portion will be described with reference to FIGS. 17 to 19, and the step S200 of forming the outer structure will be described with reference to FIGS. 20 to 25.

Figure 17:
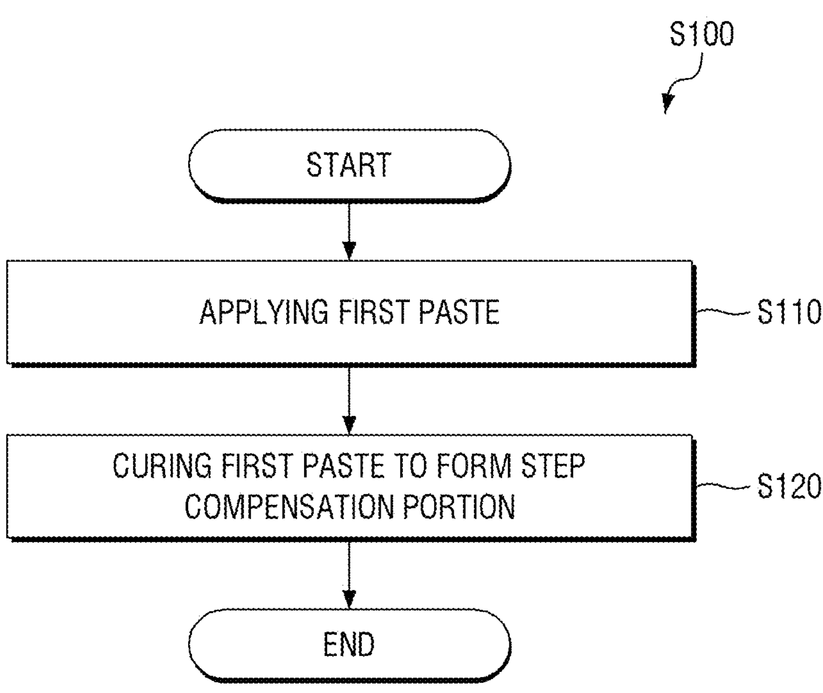
FIG. 17 is a flowchart showing step S100 of FIG. 16.
Figure 18:
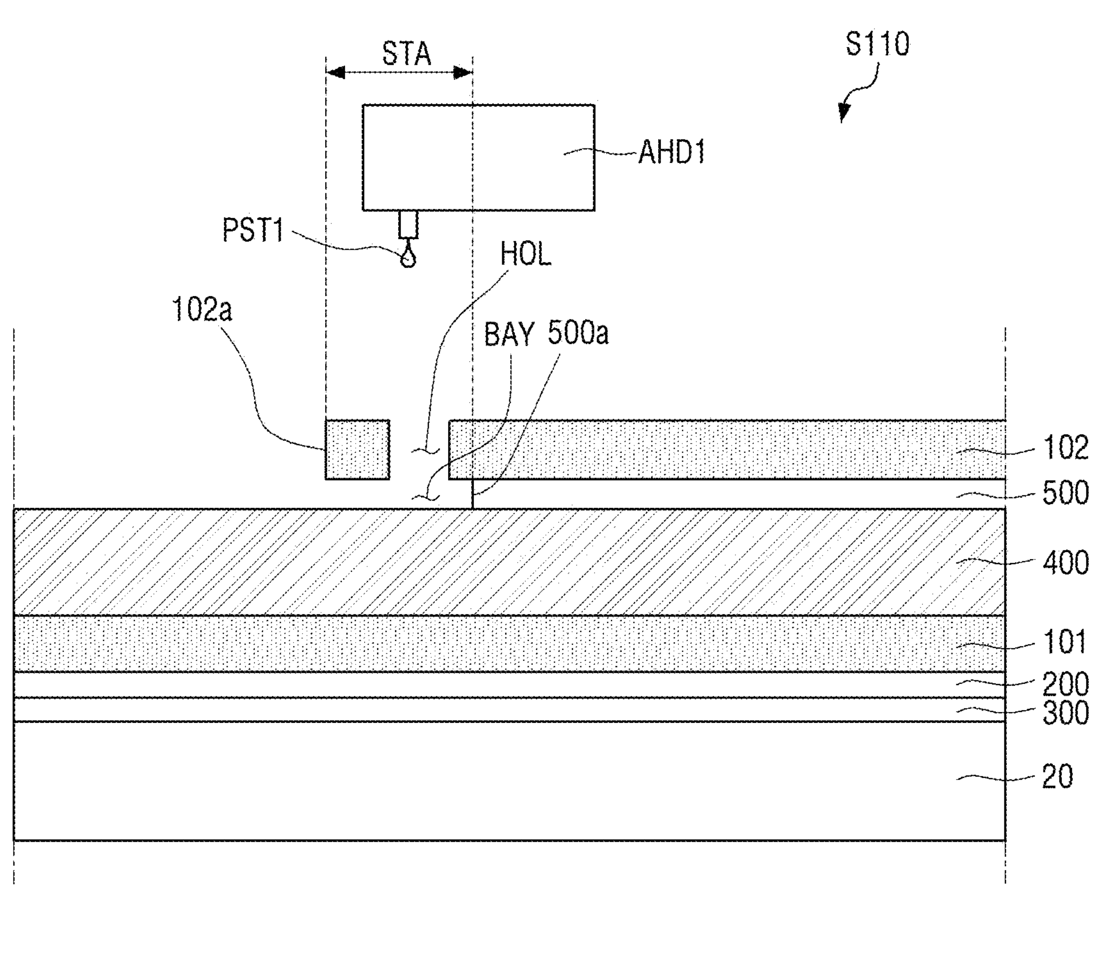
FIG. 18 is a cross-sectional view showing step S110 of FIG. 17.
Figure 19:
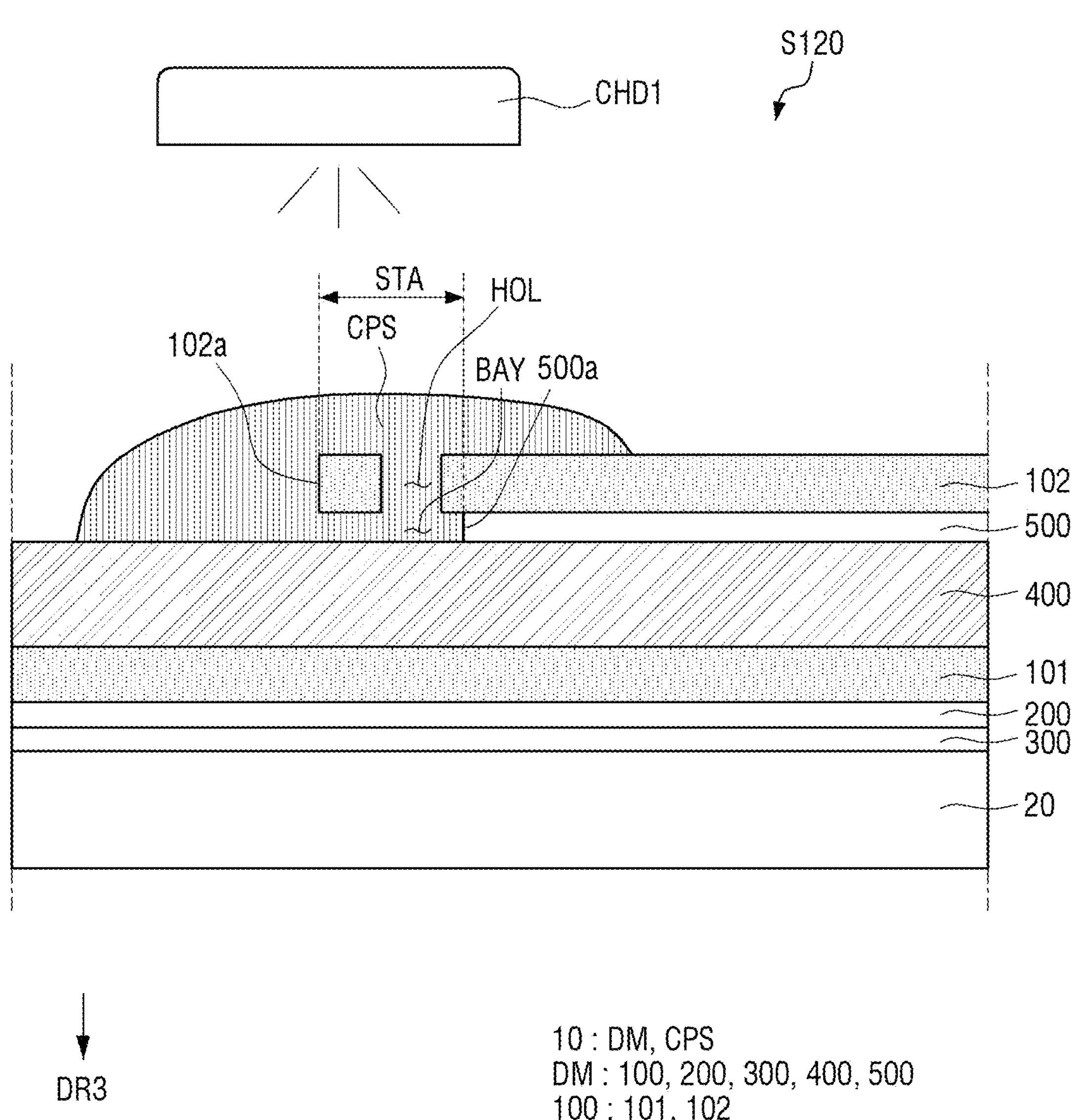
FIG. 19 is a cross-sectional view showing step S110 of FIG. 17.

FIG. 17 is a flowchart showing step S100 of FIG. 16. FIG. 18 is a cross-sectional view showing step S110 of FIG. 17. FIG. 19 is a cross-sectional view showing step S110 of FIG. 17.

Referring to FIGS. 17 to 19, the step S100 of forming the step compensation portion may include applying a first paste (step S110) and curing the first paste to form the step compensation portion (step S120). The step S100 of forming the step compensation portion may include encapsulating a reverse step of the display panel 100. The reverse step may be an undercut area below the second portion 102 of the first display panel 100, which defines the recessed portion BAY.

As shown in FIG. 18, in the step S110 of applying the first paste, the first paste PST1 may be applied using a first application device AHD1.

The first application device AHD1 may be an application device capable of applying the first paste PST1 in a liquid state, such as an inkjet device or a dispenser device. However, the present disclosure is not limited thereto, and the first application device AHD1 may include any type of application device capable of applying the first paste PST1.

The first paste PST1 may include resin in a liquid state. For example, the first paste PST1 may include optically clear resin (OCR) in a liquid state, but is not limited thereto.

The first paste PST1 may be discharged from the first application device AHD1 and applied on the cover panel 400, the cover spacer 500, and the second portion 102 of the display panel 100. The first paste PST1 may effectively permeate into the recessed portion BAY through the through hole HOL included in the second portion 102 of the display panel 100. At least a portion of the first paste PST1 may permeate into the recessed portion BAY at the first end portion of the second portion 102 of the display panel 100.

As shown in FIG. 19, in the step S120 of curing the first paste to form the step compensation portion, the step compensation portion CPS may be formed by curing the first paste PST1 using a first curing device HD1.

The first curing device CHD1 may be a curing device capable of curing the first paste PST1, such as an ultraviolet (UV) curing device, a thermal curing device, or the like. However, the present disclosure is not limited thereto, and the first curing device CHD1 may include any type of curing device capable of curing the first paste PST1.

The first paste PST1 may be cured by ultraviolet rays, heat, or the like generated from the first curing device CHD1 to become the step compensation portion CPS. The ultraviolet rays, heat, or the like generated from the first curing device CHD1 may effectively permeate into the first paste PST1 located in the recessed portion BAY through the through hole HOL, and an under-curing of the first paste PST1 may be prevented.

Figure 20:
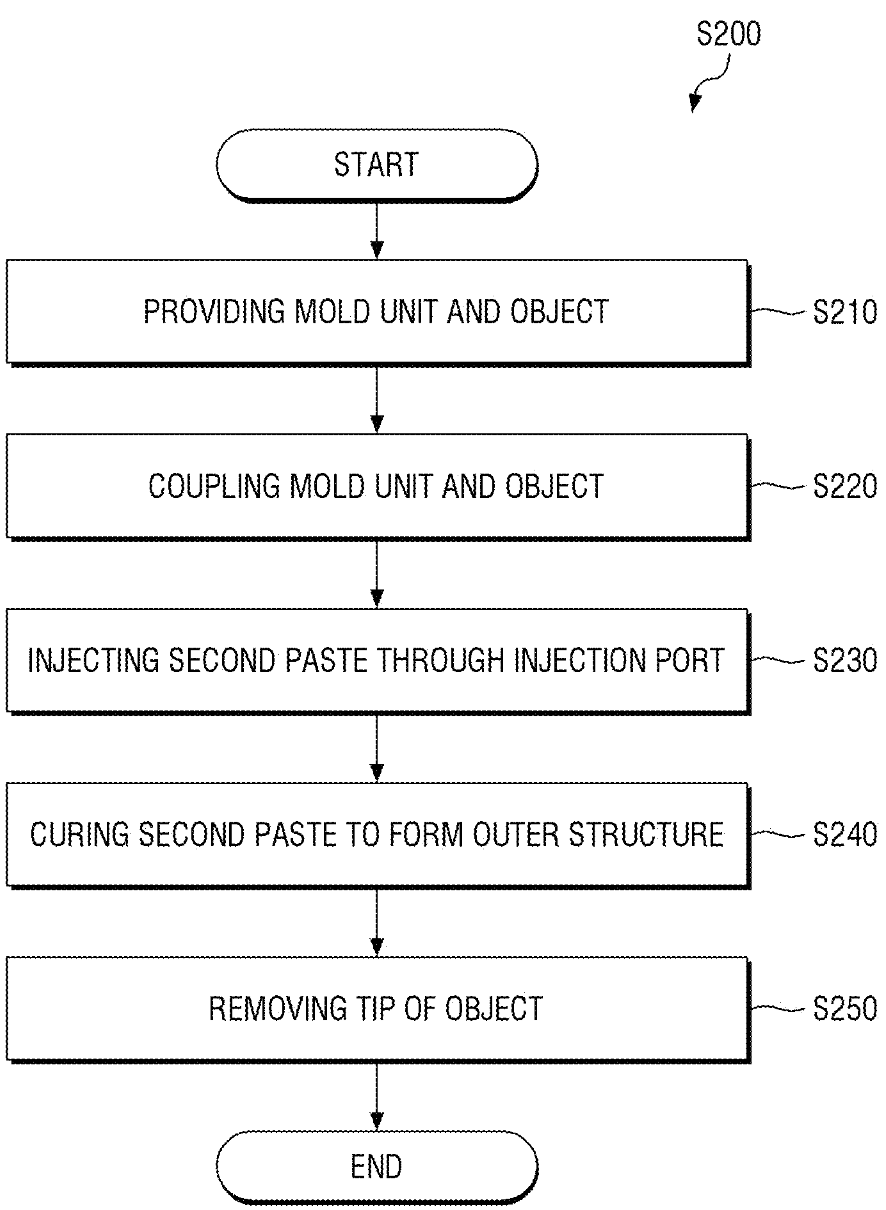
FIG. 20 is a flowchart showing step S200 of FIG. 16.
Figure 21:
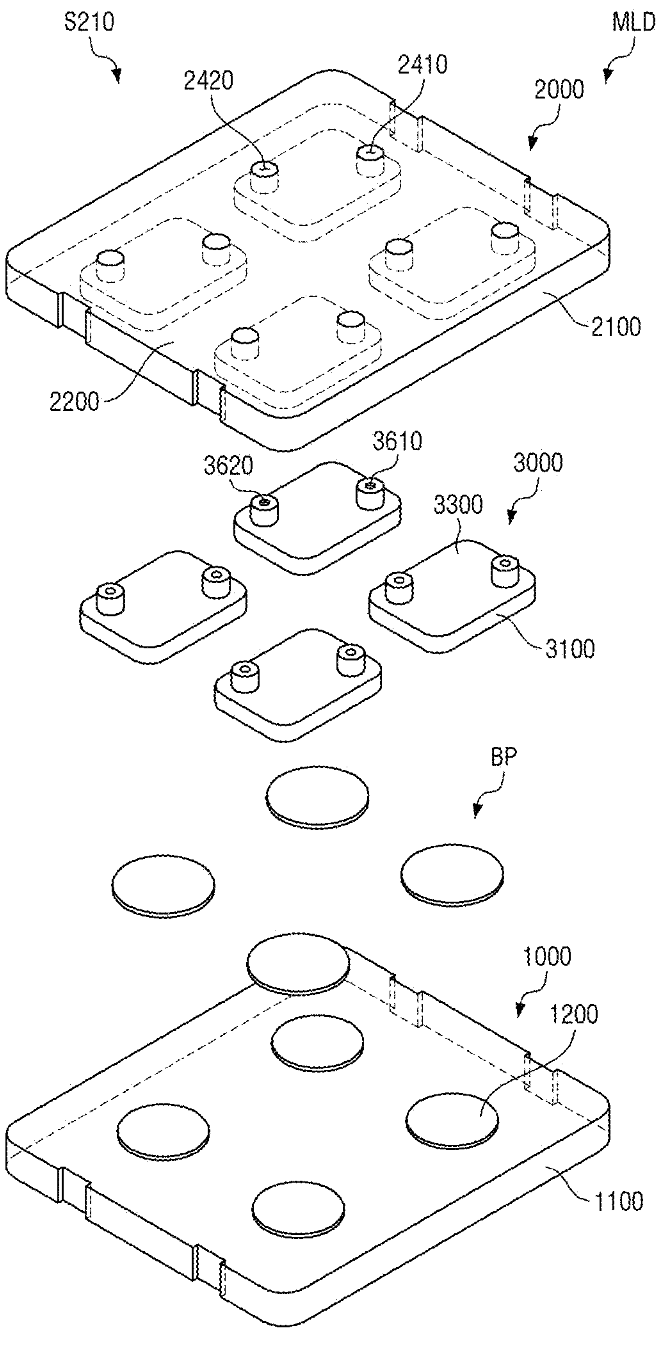
FIG. 21 is a cross-sectional view showing step S210 of FIG. 20.
Figure 22:
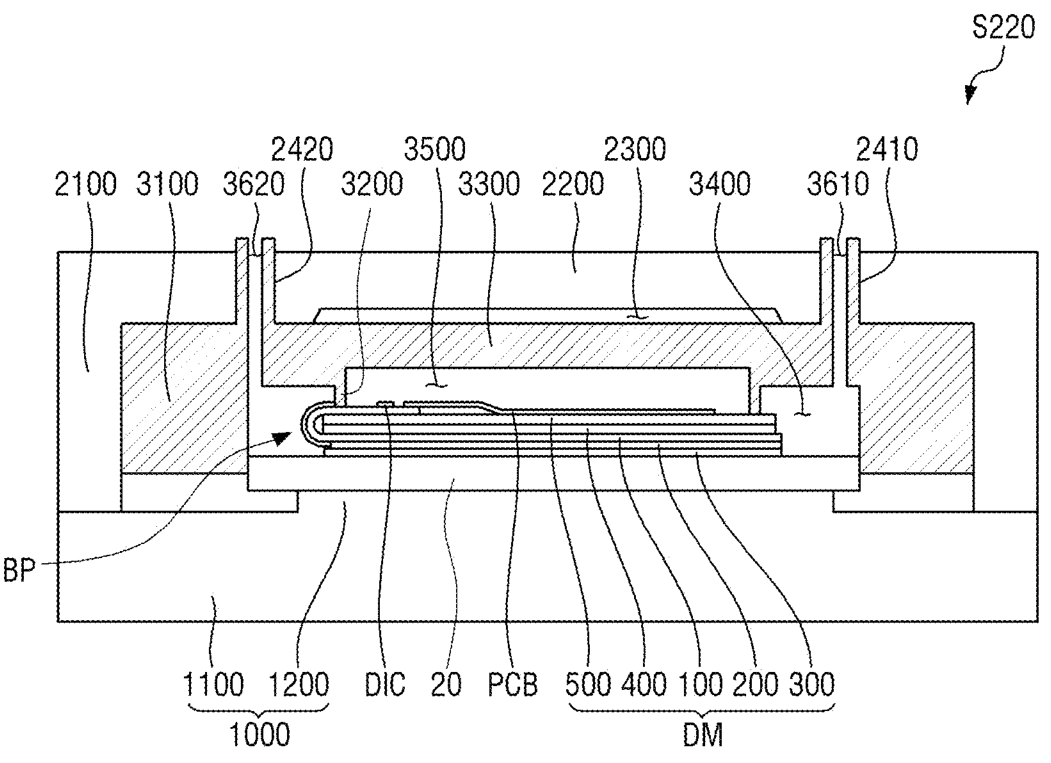
FIG. 22 is a cross-sectional view showing step S220 of FIG. 20.
Figure 22:
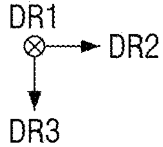
Figure 23:
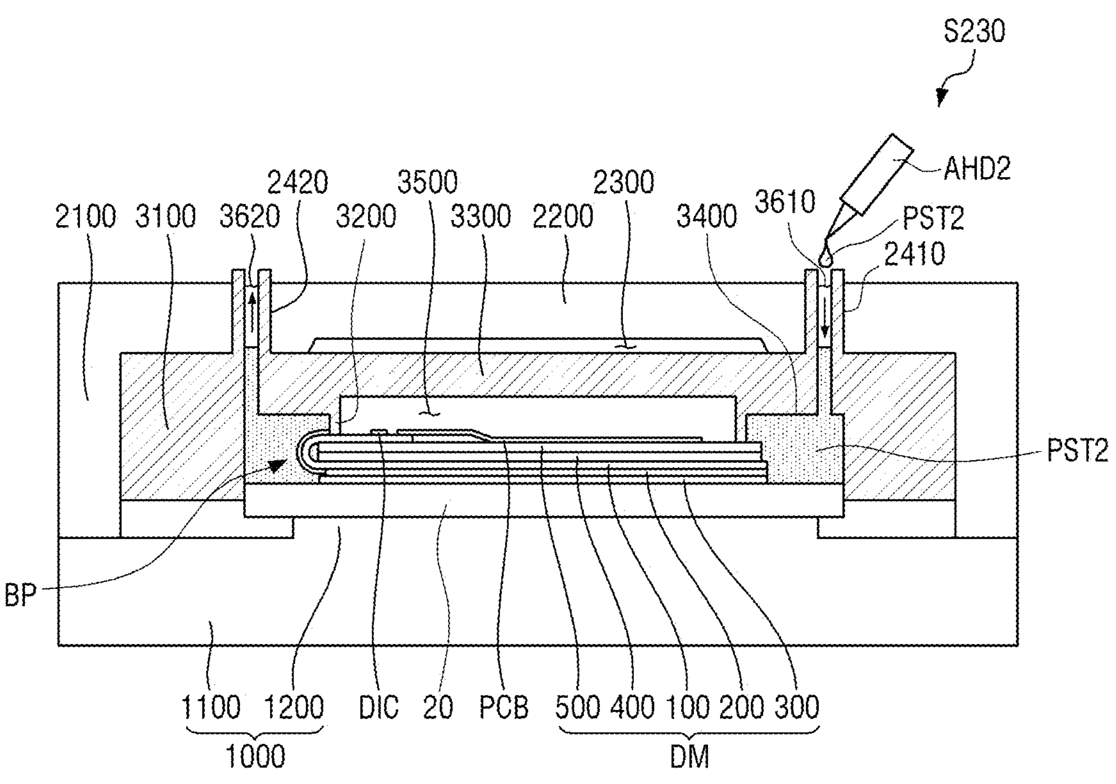
FIG. 23 is a cross-sectional view showing step S230 of FIG. 20.
Figure 23:
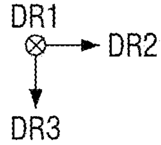
Figure 24:
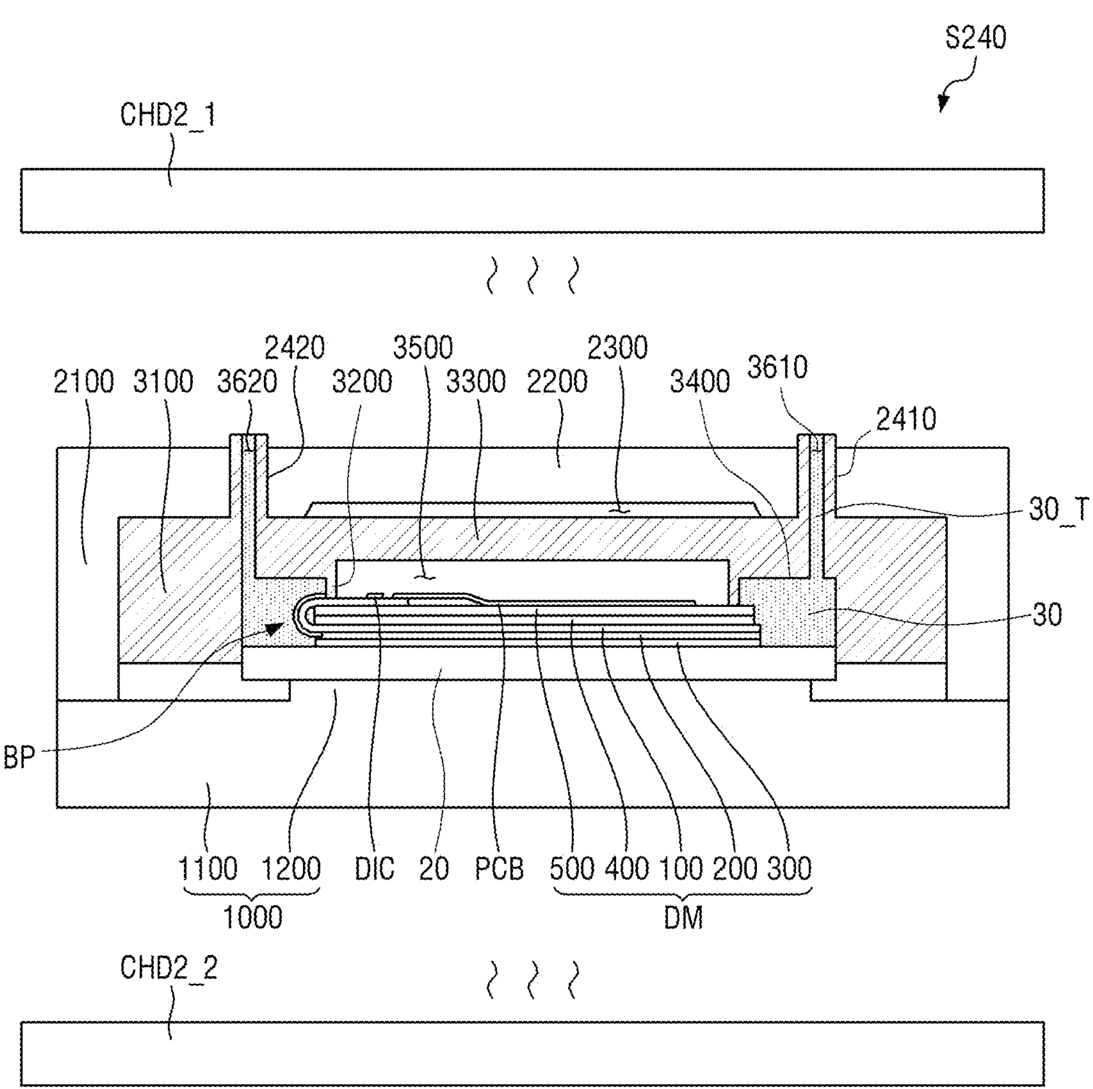
FIG. 24 is a cross-sectional view showing step S240 of FIG. 20.
Figure 24:
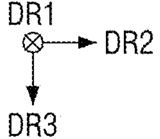
Figure 25:
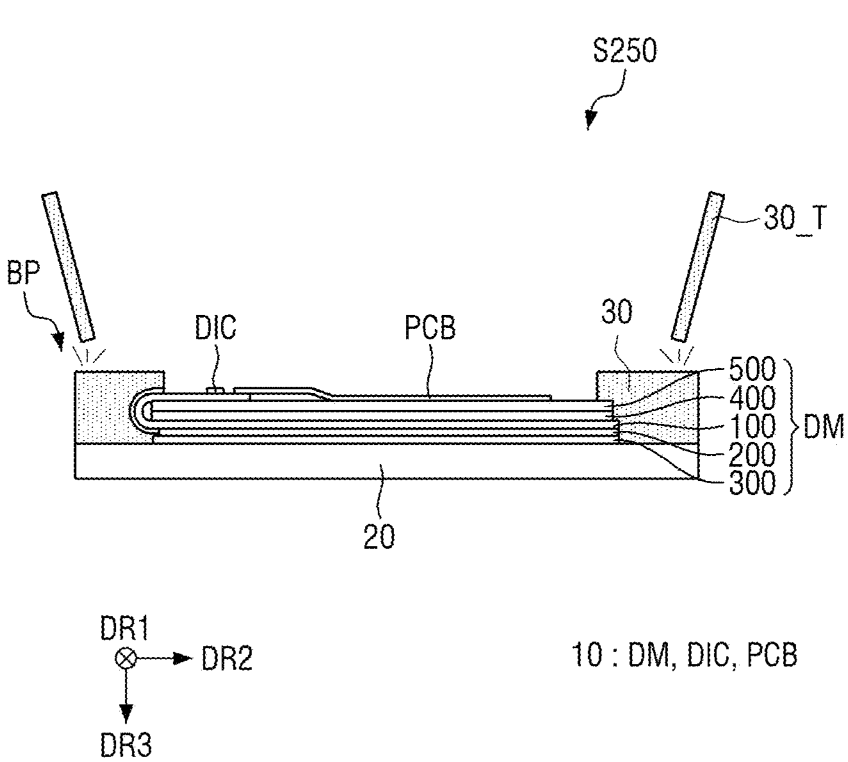
FIG. 25 is a cross-sectional view showing step S250 of FIG. 20.

FIG. 20 is a flowchart showing step S200 of FIG. 16. FIG. 21 is a cross-sectional view showing step S210 of FIG. 20. FIG. 22 is a cross-sectional view showing step S220 of FIG. 20. FIG. 23 is a cross-sectional view showing step S230 of FIG. 20. FIG. 24 is a cross-sectional view showing step S240 of FIG. 20. FIG. 25 is a cross-sectional view showing step S250 of FIG. 20.

Referring to FIGS. 20 to 25, the step S200 of forming the outer structure may include providing a mold unit and an object (step S210), coupling the mold unit and the object (step S220), injecting the second paste through an injection port (step S230), curing the second paste to form the outer structure (step S240), and removing a tip of the object (step S250).

As shown in FIG. 21, in the step S210 of providing the mold unit and the object, the mold unit MLD and the object may be provided.

The object may be the main body unit BP of the display device 1 described herein, for example, with reference to FIG. 1. The main body unit BP, which may be the object of the display device manufacturing method S1 according to an embodiment, may have a state in which the display driving module 10 and the cover window 20 are coupled, as shown in FIG. 22.

As shown in FIG. 22, the mold unit MLD may be a display device manufacturing apparatus for forming the outer structure 30. The mold unit MLD may include a lower mold 1000, an upper mold 2000, and an inner mold 3000.

The lower mold 1000 may be disposed under the main body unit BP that is an object. The lower mold 1000 may include a base 1100 and a mounting portion 1200.

The base 1100 may be the body of the lower mold 1000. The area of the base 1100 may be greater than the area of the object. Although it is illustrated in FIG. 21 that four objects may be mounted on the base 1100, the present disclosure is not limited thereto. Depending on the number of objects mounted on the base 1100, the area of the base 1100 may vary.

The mounting portion 1200 may be disposed on the base 1100. The mounting portion 1200 may be a portion that protrudes from the base 1100 in the third direction DR3 (see FIG. 22). The mounting portion 1200 and the base 1100 may be physically one component, but the present disclosure is not limited thereto. Although it is illustrated in FIG. 21 that four mounting portions 1200 may be disposed on the base 1100, the present disclosure is not limited thereto. Depending on the number of objects mounted on the base 1100, the number of mounting portions 1200 disposed on the base 1100 may vary. Further, although it is illustrated in the drawings that the size of the mounting portion 1200 may be smaller than the size of the cover window 20, the present disclosure is not limited thereto. The size of the mounting portion 1200 may be the same as or greater than the size of the cover window 20.

The upper mold 2000 may be disposed above the lower mold 1000. The upper mold 2000 may be disposed above the main body unit BP that is an object. The upper mold 2000 may include a first outer wall 2100, a first upper plate 2200, a first accommodating portion 2300, a first coupling tube 2410, and a second coupling tube 2420.

The first outer wall 2100 and the first upper plate 2200 may constitute the body of the upper mold 2000. The external shape of the upper mold 2000 defined by the first outer wall 2100 and the first upper plate 2200 may substantially correspond to the external shape of the base 1100 of the lower mold 1000, but the present disclosure is not limited thereto.

The first accommodating portion 2300 may be the space surrounded by the first outer wall 2100 and the first upper plate 2200. The first accommodating portion 2300 may provide the space for accommodating the inner mold 3000. Although a case where the number of first accommodating portions 2300 is four is illustrated in FIG. 21 as an example, the present disclosure is not limited thereto. For simplicity of description, FIGS. 22 to 24 and the following description will describe a case where the number of the first accommodating portion 2300 is one as an example.

The first coupling tube 2410 and the second coupling tube 2420 may be disposed on the first upper plate 2200. The first coupling tube 2410 and the second coupling tube 2420 may be include through holes penetrating the top surface and the bottom surface of the first upper plate 2200, passing entirely through the first upper plate 2200. The first coupling tube 2410 may include a hole for coupling an injection port 3610 of the inner mold 3000, and the second coupling tube 2420 may include a hole for coupling the injection port 3610 and a discharge port 3620 of the inner mold 3000.

In some embodiments, the lower mold 1000 and the upper mold 2000 may contain at least one of stainless steel (SUS) or aluminum (Al), but the present disclosure is not limited thereto.

The inner mold 3000 may be disposed between the lower mold 1000 and the upper mold 2000. The inner mold 3000 may be an additional mold disposed between the lower mold 1000 and the upper mold 2000 to accurately seal the object. The inner mold 3000 may include a second outer wall 3100, an inner wall 3200, a second upper plate 3300, a cavity 3400, a second accommodating portion 3500, the injection port 3610, and the discharge port 3620.

The second outer wall 3100 and the second upper plate 3300 may constitute the body of the inner mold 3000. The outer shape of the inner mold 3000 may be defined by the second outer wall 3100 and the second upper plate 3300 and may substantially correspond to the outer shape of the first accommodating portion 2300 of the upper mold 2000, but the present disclosure is not limited thereto.

The inner wall 3200 may be located at the inner side of the second outer wall 3100. The inner wall 3200 may be surrounded by the second outer wall 3100. The inner wall 3200 may be a partition wall for isolating the cavity 3400 and the second accommodating portion 3500. The inner wall 3200 may, but not necessarily, extend substantially in the third direction DR3, and may extend in a diagonal direction.

The cavity 3400 may be located between the second outer wall 3100 and the inner wall 3200. The cavity 3400 may be the space surrounded by the second outer wall 3100, the inner wall 3200, and the second upper plate 3300. The cavity 3400 may provide the space for forming the outer structure 30.

The second accommodating portion 3500 may be located at the inner side of the inner wall 3200. The second accommodating portion 3500 may be the space surrounded by the inner wall 3200 and the second upper plate 3300. In a state where the mold unit MLD is coupled, the second accommodating portion 3500 may be isolated from the cavity 3400 by the inner wall 3200. Accordingly, it may be possible to inhibit or prevent the second paste PST2 from leaking into the second accommodating portion 3500.

The injection port 3610 and the discharge port 3620 may be disposed on the second upper plate 3300. The injection port 3610 and the discharge port 3620 may be passages penetrating the second upper plate 3300. The injection port 3610 and the discharge port 3620 may be passages penetrating the top surface and the bottom surface of the second upper plate 3300, passing entirely through the second upper plate 3300. The injection port 3610 and the discharge port 3620 may protrude further in the third direction DR3 than the second upper plate 3300. The protrusions of the injection port 3610 and the discharge port 3620 may be coupled to the first coupling tube 2410 and the second coupling tube 2420 of the upper mold 2000, respectively.

The injection port 3610 may be a passage through which the second paste PST2 may be injected. The discharge port 3620 may be a passage through which an excessively injected second paste PST2 may be discharged. The injection port 3610 and the discharge port 3620 may be passages that connect the cavity 3400 and the outside so that the second paste PST2 may be injected into the cavity 3400 or discharged from the cavity 3400.

As shown in FIG. 22, in the step S220 of coupling the mold unit and the object, the upper mold 2000, the inner mold 3000, the object, and the lower mold 1000 may be arranged sequentially. The mold unit MLD may be coupled as the upper mold 2000, the inner mold 3000, and the lower mold 1000 become closer to each other with the object interposed therebetween.

In a state where the mold unit MLD is coupled, the object may be completely sealed by the mold unit MLD. For example, the top surface of the cover window 20 may be in contact with the lower mold 1000, the side surface of the cover window 20 may be in contact with the inner surface of the second outer wall 3100, and the bottom surface of the display driving module 10 may be in contact with the bottom surface of the inner wall 3200. Accordingly, the cavity 3400 may be completely sealed by the bottom surface of the cover window 20, the inner surface of the second outer wall 3100, the bottom surface of the second upper plate 3300, the outer surface of the inner wall 3200, and the outer part of the display driving module 10.

Although it is illustrated in the drawings that the bottom surface of the first outer wall 2100 of the upper mold 2000 may be in contact with the top surface of the base 1100 in a state where the mold unit MLD is coupled, the present disclosure is not limited thereto. In a state where the mold unit MLD is coupled, the bottom surface of the first outer wall 2100 of the upper mold 2000 may not be in contact with the top surface of the base 1100.

Further, although it is illustrated in the drawings that the bottom surface of the second outer wall 3100 of the inner mold 3000 may not be in contact with the top surface of the base 1100 of the lower mold 1000 in a state where the mold unit MLD is coupled, the present disclosure is not limited thereto. In a state where the mold unit MLD is coupled, the bottom surface of the second outer wall 3100 of the inner mold 3000 may be in contact with the top surface of the base 1100 of the lower mold 1000.

In some embodiments, the inner mold 3000 may contain a material having an appropriate strength and elasticity so that the shape of the inner mold 3000 may be maintained in a normal state but may partially change when the mold unit MLD is coupled. For example, the inner mold 3000 may contain silicon, but is not limited thereto. Accordingly, even if a step is formed at a portion to be in contact with the inner mold 3000, the shape of the inner mold 3000 may change to correspond to the shape of the step, and the effect of sealing the cavity 3400 may be improved.

However, in some embodiments, in the case of a reverse step structure such as the recessed portion BAY, the complete sealing may not be obtained by the protrusion of the second portion 102 of the display panel 100. Therefore, in the display device manufacturing method S1 according to an embodiment, even the recessed portion BAY may be completely sealed by performing the step S100 of forming the step compensation portion before the step S200 of forming the outer structure.

In some embodiments, although not shown in the drawings, the inner wall 3200 of the inner mold 3000 may overlap the step compensation portion CPS. As described above with reference to FIG. 9, the inner mold contact area IMA (see FIG. 9) may overlap the step compensation portion CPS, so that the inner wall 3200 may overlap the step compensation portion CPS.

In some embodiments, the top surface of the step compensation portion CPS may not be flat as shown in FIG. 19. For example, the top surface of the step compensation portion CPS may be uneven, or include a pattern. Since, however, the shape of the inner mold 3000 may be changed when it is pressed, the sealing effect may be achieved even by the contact with the top surface of the step compensation portion CPS that is not flat.

As shown in FIG. 23, in the step S230 of injecting the second paste through the injection port, the second paste PST2 may be injected into the cavity 3400 using a second application device AHD2.

The second application device AHD2 may be an injection device capable of injecting the second paste PST2 in a liquid state, such as an inkjet device, a dispenser device, or the like.

The second paste PST2 may contain resin in a liquid state. For example, the second paste PST2 may contain optically clear resin (OCR) in a liquid state, but is not limited thereto.

In some embodiments, the first paste PST1 and the second paste PST2 may have different viscosities. For example, the viscosity of the second paste PST2 may be greater than the viscosity of the first paste PST1. For example, the viscosity of the second paste PST2 may be about 2000 centipoise (cPs) or more, and the viscosity of the first paste PST1 may be about 1000 cPs or less, but the present disclosure is not limited thereto.

The second paste PST2 may be discharged from the second application device AHD2 and injected into the cavity 3400 through the injection port 3610. Since the cavity 3400 surrounds the display driving module 10 along the inner wall 3200, the second paste PST2 injected into the cavity 3400 moves in a clockwise direction and/or in a counterclockwise direction, and the entire cavity 3400 may be filled.

In some embodiments, when the amount of the second paste PST2 exceeds the volume of the cavity 3400, that is, when the cavity 3400 is filled, an excess amount of the second paste PST2 may be discharged through the discharge port 3620. The excess amount of the second paste PST2 may remain at the injection port 3610 and the discharge port 3620.

In the display device manufacturing method S1 according to an embodiment, the cavity 3400 may be located in the outer structure arrangement area BSA (see FIG. 9) described herein, and the inner wall 3200 may be located in the inner mold contact area IMA (see FIG. 9) described herein. In this case, the inner wall 3200 may at least partially overlap the recessed portion BAY of the step area STA (see FIG. 9). The recessed portion BAY may not be sealed by the inner wall 3200, but may be sealed by the step compensation portion CPS. Accordingly, the second paste PST2 injected into the cavity 3400 may not permeate into the second accommodating portion 3500 while moving in a clockwise direction and/or in a counterclockwise direction in the cavity 3400.

As shown in FIG. 24, in the step S240 of curing the second paste to form the outer structure, the second paste PST2 may be cured by thermal curing or UV curing to form the outer structure 30.

In some embodiments, the mold unit MLD may further include a second curing device CHD2.

The second curing device CHD2 may be a curing device capable of curing the second paste PST2, such as a UV curing device or a thermal curing device. However, the present disclosure is not limited thereto, and the second curing device CHD2 may include any type of curing device capable of curing the second paste PST2.

For example, the second curing device CHD2 may include a first curing part CHD2_1 disposed above the upper mold 2000 and a second curing part CHD2_2 disposed under the lower mold 1000. However, the present disclosure is not limited thereto, and a separate second curing device CHD2 surrounding the entire mold unit MLD may be provided to apply ultraviolet rays, heat, or the like from all directions.

An excess amount of the second paste PST2 remaining at the injection port 3610 and the discharge port 3620 may be cured to form a tip 30_T.

As shown in FIG. 25, in the step S250 of removing the tip of the object, the tip 30_T located on the outer structure 30 may be removed using a separate cutting device.

Although it is illustrated in the drawings that the tip 30_T overlaps the outer structure 30 in the third direction DR3, the present disclosure is not limited thereto. In some embodiments, the tip 30_T may not overlap the outer structure 30 in the third direction DR3. In this case, the injection port 3610 and the discharge port 3620 may not overlap the cavity 3400 in the third direction DR3. Accordingly, when the tip 30_T is removed, it may be possible to inhibit or prevent a step from being formed at the bottom surface of the outer structure 30.

In concluding the detailed description, those skilled in the art will appreciate that many variations and modifications can be made to embodiments without substantially departing from the principles of the present disclosure. Therefore, embodiments of the invention are used in a generic and descriptive sense only and not for purposes of limitation.

What is claimed is:

1. A display device comprising:
a display module, the display module comprising:
a cover spacer,
a display panel comprising a first portion and a second portion located on opposite sides of the cover spacer, the first portion including a display area, and
a step compensation portion disposed on the second portion of the display panel and an edge portion of the cover spacer; and
an outer structure surrounding an outer part of the display module, wherein
an edge portion of the second portion of the display panel extends inward from the outer part of the display module and protrudes beyond the edge portion of the cover spacer,
a recessed portion is disposed at the edge portion of the cover spacer and under the edge portion of the second portion of the display panel, and
the step compensation portion overlaps the recessed portion.

2. The display device of claim 1, wherein the step compensation portion is disposed at an inner side of the outer structure.

3. The display device of claim 1, wherein the step compensation portion is spaced apart from the outer structure.

4. The display device of claim 1, further comprising:
a cover window, disposed on
the first portion of the display panel, wherein
the step compensation portion overlaps the edge portion of the second portion.

5. The display device of claim 1, wherein the step compensation portion is filled in the recessed portion.

6. The display device of claim 5, wherein the step compensation portion is in contact with at least one of a bottom surface, a side surface, or a top surface of a first end portion of the display panel disposed at the edge portion of the second portion of the display panel.

7. The display device of claim 1, wherein the step compensation portion is in contact with a side surface of the edge portion of the cover spacer defining an end of the recessed portion.

8. The display device of claim 1, wherein
the display panel comprises a through hole at the edge portion of the second portion of the display panel penetrating entirely through the display panel and exposing at least a portion of the recessed portion.

9. The display device of claim 8, wherein the through hole is disposed at the edge portion of the second portion of the display panel and has a combed shape or a saw-toothed shape.

10. The display device of claim 8, wherein the through hole is spaced apart from the edge portion of the second portion of the display device and is disposed at a first end portion of the display panel.

11. The display device of claim 10, wherein the first end portion of the display device has a ladder shape that extends inward, away from the outer structure.

12. The display device of claim 8, wherein the through hole comprises a plurality of holes spaced apart from each other and disposed adjacent to the edge portion of the display panel to extend inward, away from the outer structure.

13. The display device of claim 8, wherein the through hole comprises a single hole extending inward, away from the outer structure and adjacent to the edge portion of the display panel.

14. A display device comprising:
a display panel comprising a main region, a bending area disposed on a side of the main region and bent to a bottom side of the main region, and a sub-region disposed on a side of the bending area and at the bottom side of the main region, and comprising a first portion disposed in the main region and a second portion disposed in the sub-region;
a cover spacer disposed between the first portion and the second portion;
a step compensation portion disposed on the second portion of the display panel; and
an outer structure disposed to surround the display panel, the cover spacer, and the step compensation portion, wherein an edge portion of the second portion extending inward, away from the outer structure and protruding beyond an edge portion of the cover spacer, forming a recessed portion disposed between the first portion and the edge portion of the second portion and at the edge portion of the cover spacer, and the step compensation portion overlaps the recessed portion.

15. The display device of claim 14, wherein the step compensation portion is disposed in the recessed portion and below at least a portion of the first portion.

16. The display device of claim 15, wherein the outer structure comprises:

an outer portion disposed at an outer side of the bending area, and an inner portion disposed at an inner side of the bending area.

17. The display device of claim 16, further comprising a bending protection layer disposed at an outer side of the display panel in the bending area, wherein the outer portion is in contact with the bending protection layer.

18. The display device of claim 14, wherein the display panel comprises a through hole edge portion of the second portion penetrating entirely through the display panel and exposing at least a portion of the recessed portion.

19. A display module comprising:

a cover panel;

a cover spacer disposed on the cover panel;

a display panel comprising a first portion and a second portion located on opposite sides of the cover panel, the first portion including a display area; and a step compensation portion disposed on the cover panel, the second portion of the display panel, and an edge portion of the cover spacer, wherein an edge portion of the second portion of the display panel extends inward from an outer part of the display module and protrudes beyond the edge portion of the cover spacer, a recessed portion is disposed at the edge portion of the cover spacer and between the cover panel and the edge portion of the second portion of the display panel, and the step compensation portion overlaps the recessed portion.

20. The display module of claim 19, further comprising:

a cover window disposed on the first portion of the display panel opposite the cover panel, wherein the step compensation portion overlaps the edge portion of the second portion.

* * * * *